(12) United States Patent
Rusanovskyy et al.

(10) Patent No.: US 11,582,475 B2
(45) Date of Patent: Feb. 14, 2023

(54) HISTORY-BASED MOTION VECTOR PREDICTION

(71) Applicant: QUALCOMM Incorporated, San Diego, CA (US)

(72) Inventors: Dmytro Rusanovskyy, San Diego, CA (US); Marta Karczewicz, San Diego, CA (US); Yan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/028,064

(22) Filed: Sep. 22, 2020

(65) Prior Publication Data

US 2021/0092432 A1 Mar. 25, 2021

Related U.S. Application Data

(60) Provisional application No. 62/905,311, filed on Sep. 24, 2019, provisional application No. 62/905,371, filed on Sep. 24, 2019.

(51) Int. Cl.
| | |
|---|---|
| *H04N 19/513* | (2014.01) |
| *H04N 19/159* | (2014.01) |
| *H04N 19/176* | (2014.01) |
| *H04N 19/56* | (2014.01) |

(52) U.S. Cl.
CPC ......... *H04N 19/513* (2014.11); *H04N 19/159* (2014.11); *H04N 19/176* (2014.11); *H04N 19/56* (2014.11)

(58) Field of Classification Search
CPC .. H04N 19/513; H04N 19/159; H04N 19/176; H04N 19/56
See application file for complete search history.

(56) References Cited

U.S. PATENT DOCUMENTS

| | | | | |
|---|---|---|---|---|
| 2020/0036997 A1* | 1/2020 | Li | ......................... | H04N 19/521 |
| 2020/0077113 A1* | 3/2020 | Huang | ................... | H04N 19/46 |
| 2020/0099951 A1* | 3/2020 | Hung | ..................... | H04N 19/52 |
| 2020/0137398 A1* | 4/2020 | Zhao | ...................... | H04N 19/52 |
| 2021/0160527 A1* | 5/2021 | Chuang | ................ | H04N 19/105 |

OTHER PUBLICATIONS

International Search Report and Written Opinion—PCT/US2020/052178—ISA/EPO—dated Nov. 13, 2020.

(Continued)

*Primary Examiner* — Jeremiah C Hallenbeck-Huber
(74) *Attorney, Agent, or Firm* — Qualcomm Incorporated

(57) ABSTRACT

Systems, methods, and computer-readable media are provided for updating history-based motion vector tables. In some examples, a method can include obtaining one or more blocks of video data; determining a first motion vector derived from a first control point of a block of the one or more blocks, the block being coded using an affine motion mode; determining a second motion vector derived from a second control point of the block; based on the first motion vector and the second motion vector, estimating a third motion vector for a predetermined location within the block; and populating a history-based motion vector predictor (HMVP) table with the third motion vector.

27 Claims, 20 Drawing Sheets

(56) References Cited

OTHER PUBLICATIONS

Zhang (Bytedance) K., et al., "CE2-5.5: History-Parameter-Based Affine Model Inheritance", The Joint Video Exploration Team (JVET) of ITU-T SG 16 WP 3 and ISO/IEC JTC 1/SC 29/WG 11, 14. JVET Meeting: Geneva, CH, Mar. 19-27, 2019, No. JVET-N0263,Mar. 18, 2019 (Mar. 18, 2019), XP030255300, Retrieved from the Internet: URL: http://phenix.int-evry.fr/jvet/doc_end_user/documents/14_Geneva/wg11/JVET-N0263-v2.zip, JVET-N0263.docx [retrieved on Mar. 18, 2019] p. 1.

Chen J., et al., "Algorithm Description for Versatile Video Coding and Test Model 6 (VTM 6)", MPEG Meeting, Jul. 8, 2019-Jul. 12, 2019, 15th Meeting, Joint Video Experts Team (JVET) of ITU-T SG16 WP3 and ISO/IECJTC1/SC29/WG11, 127. No. m49914, JVET-O2002-v2, Gothenburg, SE, Jul. 3-12, 2019, XP030208573, pp. 1-89, paragraph [03.2], Section 3.3.6 Matrix weighted Intra Prediction (MIP).

* cited by examiner

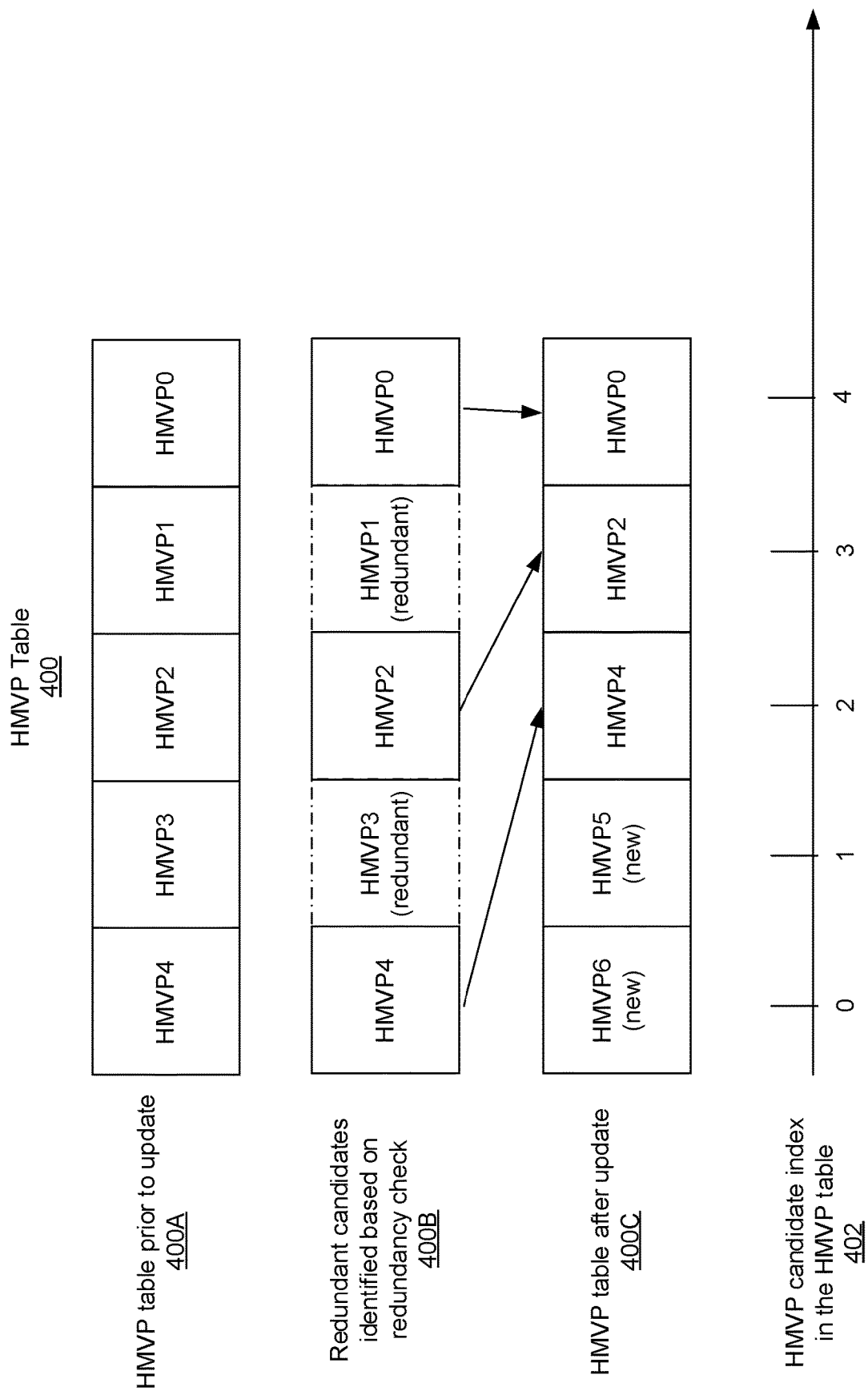

HISTORY-BASED MOTION VECTOR PREDICTION

CROSS-REFERENCE TO RELATED APPLICATIONS

The present application claims the benefit of U.S. Provisional Application No. 62/905,311, filed Sep. 24, 2019, entitled "IMPROVEMENTS OF HISTORY-BASED MOTION VECTOR PREDICTION", and U.S. Provisional Application No. 62/905,371, filed Sep. 24, 2019, entitled "HISTORY-BASED MOTION VECTOR PREDICTION", both of which are hereby incorporated by reference in their entirety and for all purposes.

FIELD

The present disclosure is generally related to video coding and compression and, more specifically, to history-based motion vector prediction.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include Essential Video Coding (EVC), high-efficiency video coding (HEVC), advanced video coding (AVC), MPEG-2 Part 2 coding (MPEG stands for moving picture experts group), VP9, Alliance of Open Media (AOMedia) Video 1 (AV1), or the like. Video coding generally utilizes prediction methods (e.g., inter-prediction, intra-prediction, or the like) that take advantage of redundancy present in video images or sequences. Generally, a goal of video coding techniques is to compress video data into a form that uses a lower bit rate, while avoiding or minimizing degradations to video quality. With ever-evolving video services becoming available, encoding techniques with better coding efficiency and performance are needed.

BRIEF SUMMARY

Disclosed are systems, methods, and computer-readable media for providing history-based motion vector prediction. According to at least one example, a method is provided for history-based motion vector prediction. The method can include obtaining one or more blocks of video data; determining a first motion vector derived from a first control point of a block of the one or more blocks, the block being coded using an affine motion mode; determining a second motion vector derived from a second control point of the block; based on the first motion vector and the second motion vector, estimating a third motion vector for a predetermined location within the block; and populating a history-based motion vector predictor (HMVP) table with the third motion vector.

According to at least one example, an apparatus is provided for history-based motion vector prediction. In some examples, the apparatus can include memory and one or more processors coupled to the memory, the one or more processors being configured to obtain one or more blocks of video data; determine a first motion vector derived from a first control point of a block of the one or more blocks, the block being coded using an affine motion mode; determine a second motion vector derived from a second control point of the block; based on the first motion vector and the second motion vector, estimate a third motion vector for a predetermined location within the block; and populate a history-based motion vector predictor (HMVP) table with the third motion vector.

According to at least one example, a non-transitory computer-readable medium is provided for history-based motion vector prediction. The non-transitory computer-readable medium can include instructions stored thereon which, when executed by one or more processors, cause the one or more processors to obtain one or more blocks of video data; determine a first motion vector derived from a first control point of a block of the one or more blocks, the block being coded using an affine motion mode; determine a second motion vector derived from a second control point of the block; based on the first motion vector and the second motion vector, estimate a third motion vector for a predetermined location within the block; and populate a history-based motion vector predictor (HMVP) table with the third motion vector.

According to at least one example, an apparatus is provided for generating obfuscated control interfaces for history-based motion vector prediction. The apparatus can include means for obtaining one or more blocks of video data; determining a first motion vector derived from a first control point of a block of the one or more blocks, the block being coded using an affine motion mode; determining a second motion vector derived from a second control point of the block; based on the first motion vector and the second motion vector, estimating a third motion vector for a predetermined location within the block; and populating a history-based motion vector predictor (HMVP) table with the third motion vector.

In some aspects, the method, computer-readable medium, and apparatuses described above can add one or more HMVP candidates from the HMVP table to at least one of an advanced motion vector prediction (AMVP) candidate list, a merge mode candidate list, and a motion vector prediction predictor for coding using the affine motion mode.

In some examples, the predetermined location can include a center of the block. In some examples, the first control point can include a top-left control point and the second control point can include a top-right control point. In some cases, the third motion vector can be estimated further based on a control point motion vector associated with a bottom control point.

In some cases, estimating the third motion vector can include determining, based on a difference between the first motion vector and the second motion vector, a rate of change between the first motion vector and the second motion vector; and multiplying the rate of change by a multiplication factor corresponding to the predetermined location. In some examples, the predetermined location can include a center of the block, and the multiplication factor can include half of a width of the block and/or a height of the block. In some examples, the rate of change can include a per unit rate of change, and each unit of the per unit rate of change can include a sample, a sub-block, and/or a pixel. In some cases, the multiplication factor can include a number of samples between the predetermined location and a border of the block.

In some examples, the third motion vector is based on a first change of motion between a horizontal component of the first motion vector and a horizontal component of the second motion vector and a second change of motion between a vertical component of the first motion vector and a vertical component of the second motion vector.

In some examples, the third motion vector can include a translational motion vector generated based on affine motion information associated with the block. In some cases, the third motion vector can include motion information associated with one or more sub-blocks of the block, and at least one sub-block of the one or more sub-blocks corresponds to the predetermined location.

In some cases, the HMVP table and/or the third motion vector can be used in motion prediction of an additional block.

In some aspects, each apparatus described above is or includes a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, an autonomous vehicle, an encoder, a decoder, or other device. In some aspects, the apparatus includes a camera or multiple cameras for capturing one or more videos and/or images. In some aspects, the apparatus further includes a display for displaying one or more videos and/or images. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 4 is a diagram illustrating an example history-based motion vector predictor (HMVP) table, in accordance with some examples;

DETAILED DESCRIPTION

Figure 1:
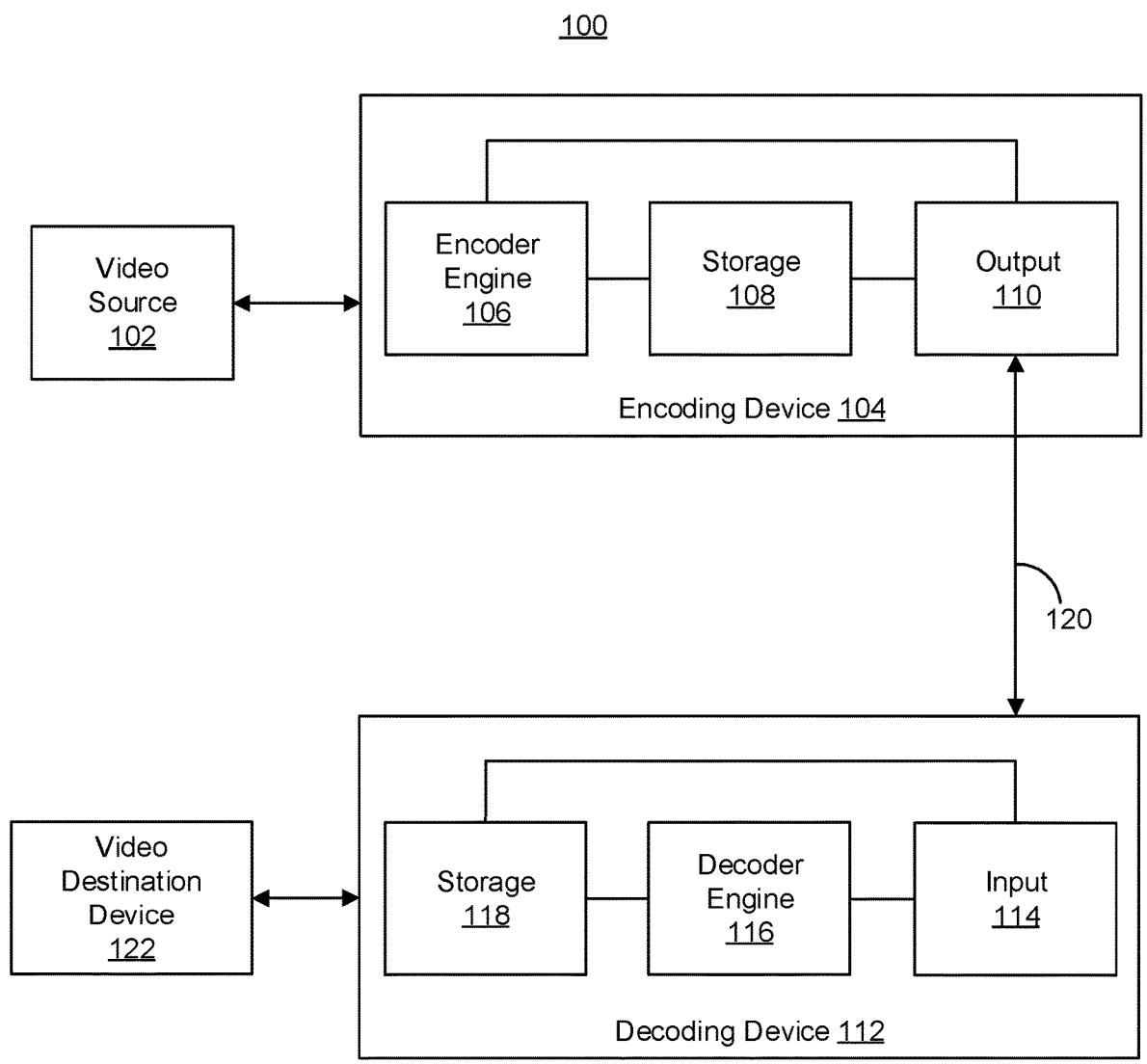
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As described in more detail below, systems, apparatuses, methods (also referred to as processes), and computer-readable media are described herein for using affine motion information for history-based motion vector prediction. The techniques described herein can be applied to one or more of a variety of block based video coding techniques in which video is reconstructed on block-by-block basis. For example, the techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Essential Video Coding (EVC), Versatile Video Coding (VVC), the joint exploration model (JEM), VP9, AV1, and/or other video coding standard in development or to be developed.

In some examples, the approaches described herein can be used to generate a translational motion vector based on an affine coded block. An affine motion model can use multiple control points to derive multiple motion vectors for a block. For example, the affine motion model can generate multiple local motion vectors for sub-blocks or pixels of a block. However, in certain video coding standards, history-based motion vector prediction (HMVP) tables used for HMVP only include and/or support a single translational motion vector per block. Thus, in some examples, to expand the type of motion information included in an HMVP table, the approaches herein can approaches herein can approximate a translational vector for a block using affine motion information and include the translational vector in the HMVP table. The translational vector can represent motion information for the block, which can be used for HMVP once included in the HMVP table.

In some cases, the approaches described herein can generate a motion vector for a center location of the block based on a control point motion vector associated with a top-left control point and a control point motion vector associated with a top-right control point. For example, the approaches herein can calculate a rate of change between a horizontal and vertical component of the control point motion vectors associated with the top-left and top-right control points, and generate a motion vector for the center location based on the rate of change. The motion vector can be representative of the motion information for the block, and can be included in the HMVP table for future use in motion prediction.

Figure 16:
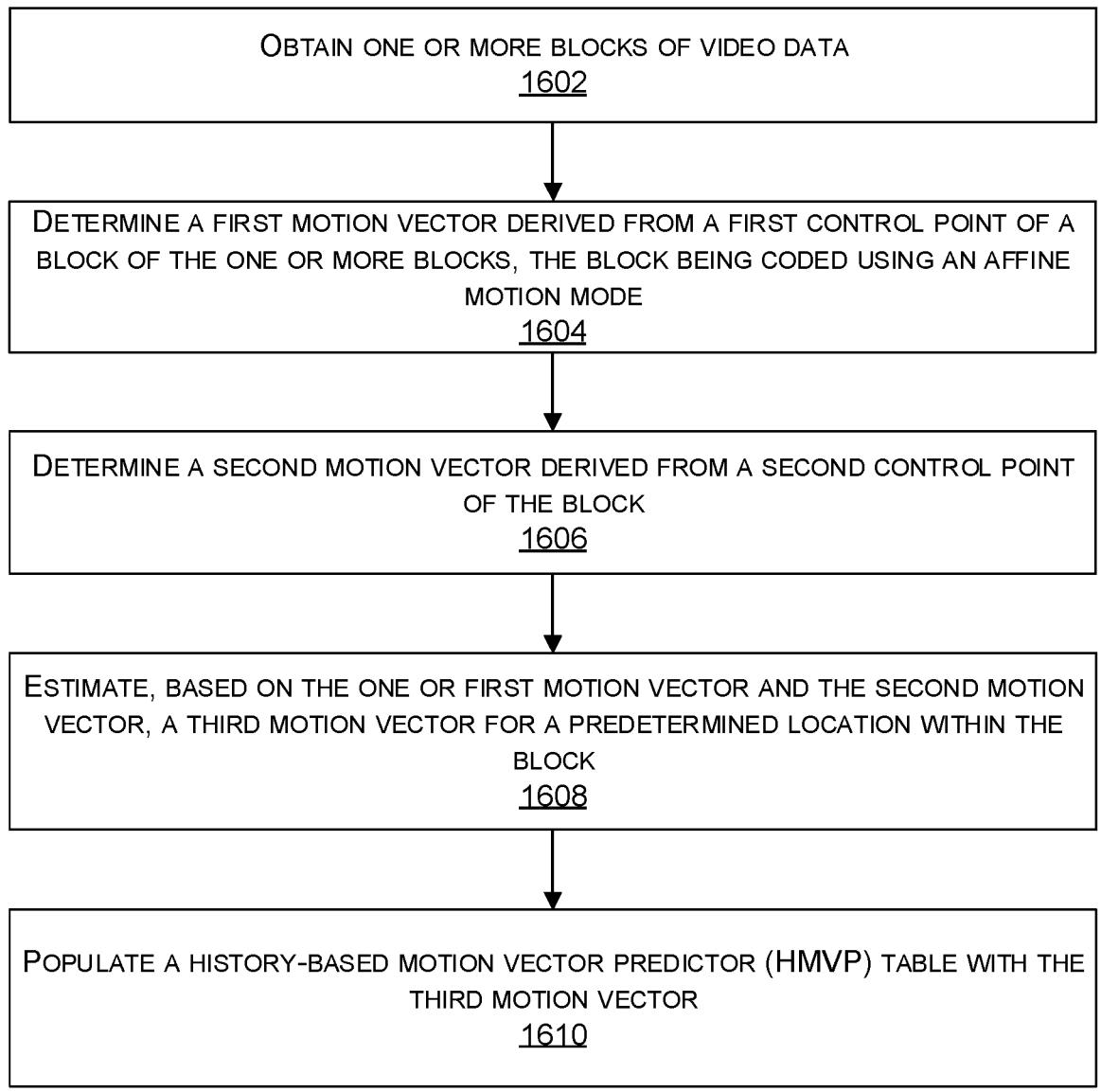
FIG. 16 is a flowchart illustrating an example process for updating a history-based motion prediction table with motion information generated from an affine-coded block, in accordance with some examples.
Figure 17:
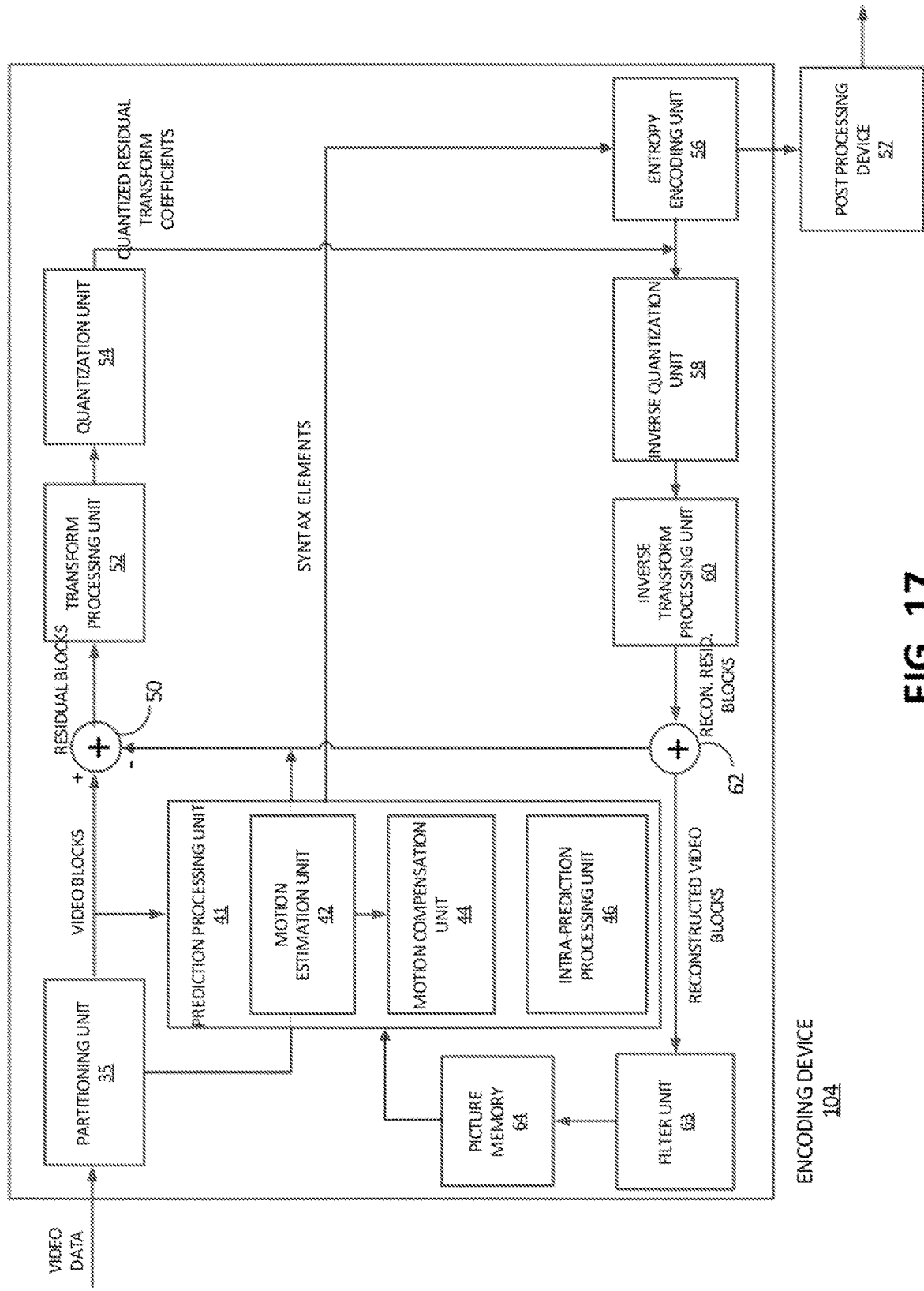
FIG. 17 is a block diagram illustrating an example encoding device, in accordance with some examples.
Figure 18:
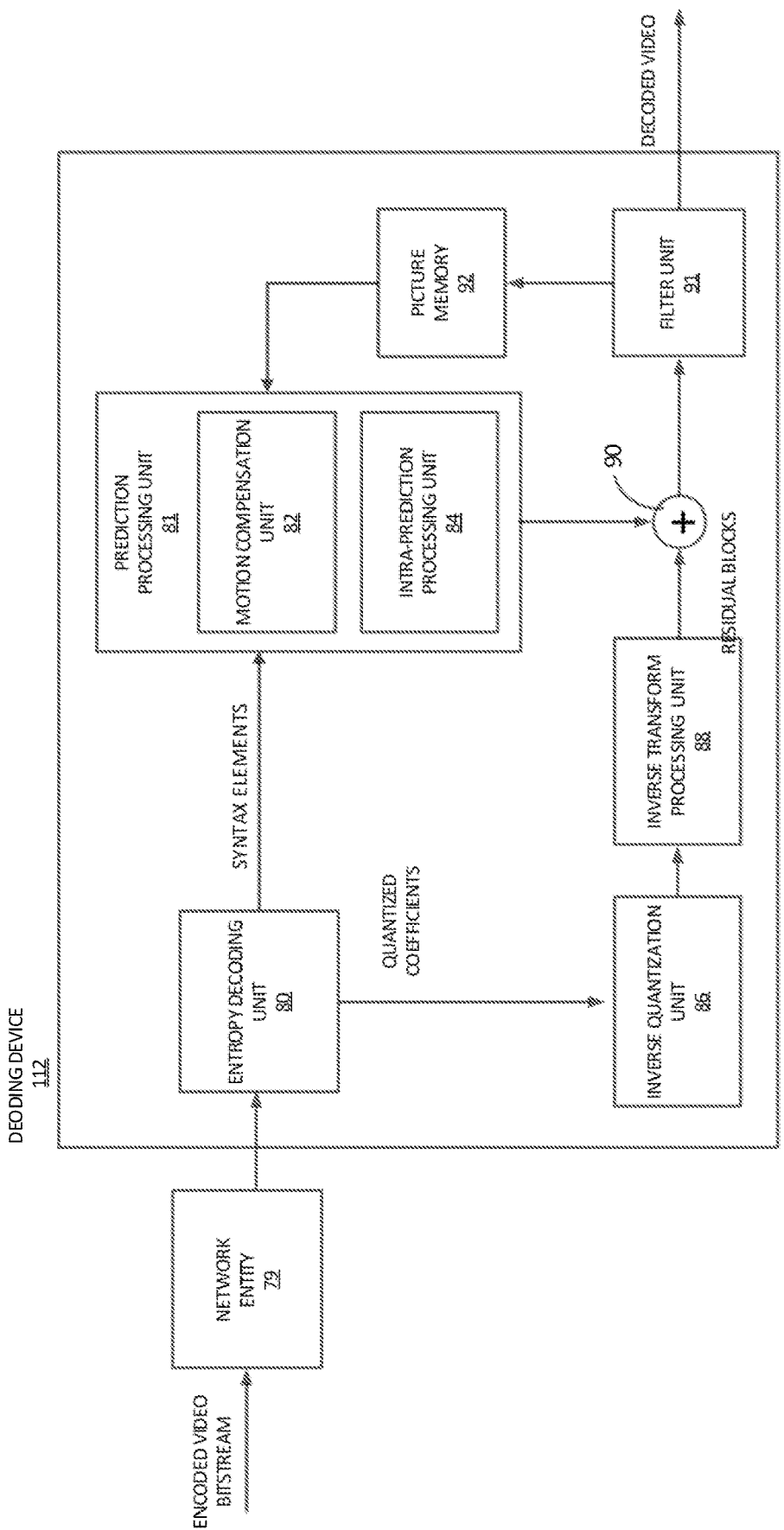
FIG. 18 is a block diagram illustrating an example video decoding device, in accordance with some examples.

The present technologies will be described in the following disclosure as follows. The discussion begins with a description of example systems and technologies for video coding and motion vector prediction, as illustrated in FIG. 1 through FIG. 15. A description of an example method for updating a history-based motion prediction table with motion information generated from an affine-coded block, as illustrated in FIG. 16, will then follow. The discussion concludes with a description of an example encoding device architecture and an example decoding device architecture, as illustrated in FIGS. 17 and 18. The disclosure now turns to FIG. 1.

FIG. 1 is a block diagram illustrating an example of a system 100 including an encoding device 104 and a decoding device 112. The encoding device 104 may be part of a source device, and the decoding device 112 may be part of a receiving device (also referred to as a client device). The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 100 is shown to include certain components, one of ordinary skill will appreciate that the system 100 can include more or fewer components than those shown in FIG. 1. For example, the system 100 can also include, in some instances, one or more memory devices other than the storage 108 and the storage 118 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (WET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). Essential Video Coding (EVC), VP9 and Alliance of Open Media (AOMedia) Video 1 (AV1) are other video coding standards for which the techniques described herein can be applied.

Many embodiments described herein can be performed using video codecs such as EVC, VTM, VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0, y_0, \text{refIdx}_0$ and $\Delta x_1, y_1, \text{refIdx}_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0, y_0, \text{refIdx}_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 106 may form one or more TUs including the residual data for a CU (which includes the PUs), and may then transform the TUs to produce transform coefficients for the CU. The TUs may comprise coefficients in the transform domain following application of a block transform.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not)

depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As described above, for each block, a set of motion information (also referred to herein as motion parameters) can be available. A set of motion information can contain motion information for forward and backward prediction directions. Here, forward and backward prediction directions are two prediction directions of a bi-directional prediction mode and the terms "forward" and "backward" do not necessarily have a geometry meaning. Instead, forward and backward can correspond to a reference picture list 0 (RefPicList0) and a reference picture list 1 (RefPicList1) of a current picture, slice, or block. In some examples, when only one reference picture list is available for a picture, slice, or block, only RefPicList0 is available and the motion information of each block of a slice is always forward. In some examples, RefPicList0 includes reference pictures that precede a current picture in time, and RefPicList1 includes reference pictures that follow the current picture in time. In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of a reference picture set as in HEVC, and/or motion vector scaling, among other things.

In H.264/AVC, each inter-macroblock (MB) may be partitioned into four different ways, including: one 16×16 macroblock partition; two 16×8 macroblock partitions; two 8×16 macroblock partitions; and four 8×8 macroblock partitions, among others. Different macroblock partitions in one macroblock may have different reference index values for each prediction direction (e.g., different reference index values for RefPicList0 and RefPicList1).

In some cases, when a macroblock is not partitioned into four 8×8 macroblock partitions, the macroblock can have only one motion vector for each macroblock partition in each prediction direction. In some cases, when a macroblock is partitioned into four 8×8 macroblock partitions, each 8×8 macroblock partition can be further partitioned into sub-blocks, each of which can have a different motion vector in each prediction direction. An 8×8 macroblock partition can be divided into sub-blocks in different ways, including: one 8×8 sub-block; two 8×4 sub-blocks; two 4×8 sub-blocks; and four 4×4 sub-blocks, among others. Each sub-block can have a different motion vector in each prediction direction. Therefore, a motion vector can be present in a level equal to or higher than a sub-block.

In HEVC, the largest coding unit in a slice is called a coding tree block (CTB) or coding tree unit (CTU). A CTB contains a quad-tree, the nodes of which are coding units. The size of a CTB can range from 16×16 pixels to 64×64 pixels in the HEVC main profile. In some cases, 8×8 pixel CTB sizes can be supported. A CTB may be recursively split into coding units (CU) in a quad-tree manner. A CU could be the same size as a CTB and as small as 8×8 pixels. In some cases, each coding unit is coded with one mode, such as either intra-prediction mode or inter-prediction mode. When a CU is inter-coded using an inter-prediction mode, the CU may be further partitioned into two or four prediction units (PUs), or may be treated as one PU when further partitioning does not apply. When two PUs are present in one CU, the two PUs can be half size rectangles or two rectangles that are ¼ or ¾ the size of the CU.

When the CU is inter-coded, one set of motion information can be present for each PU, which can be derived with a unique inter-prediction mode. For example, each PU can be coded with one inter-prediction mode to derive the set of motion information. In some cases, when a CU is intra-coded using intra-prediction mode, the PU shapes can be 2N×2N and N×N. Within each PU, a single intra-prediction mode is coded (while chroma prediction mode is signalled at the CU level). In some cases, the N×N intra PU shapes are allowed when the current CU size is equal to the smallest CU size defined in SPS.

For motion prediction in HEVC, there are two inter-prediction modes for a prediction unit (PU), including merge mode and advanced motion vector prediction (AMVP) mode. Skip is considered as a special case of merge. In either AMVP mode or merge mode, a motion vector (MV) candidate list is maintained for multiple motion vector predictors. The motion vector(s), as well as reference indices in the merge mode, of the current PU are generated by taking one candidate from the MV candidate list.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

A merge candidate may correspond to a full set of motion information, while an AMVP candidate may contain one motion vector for a specific prediction direction and a reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction.

Figure 2A:
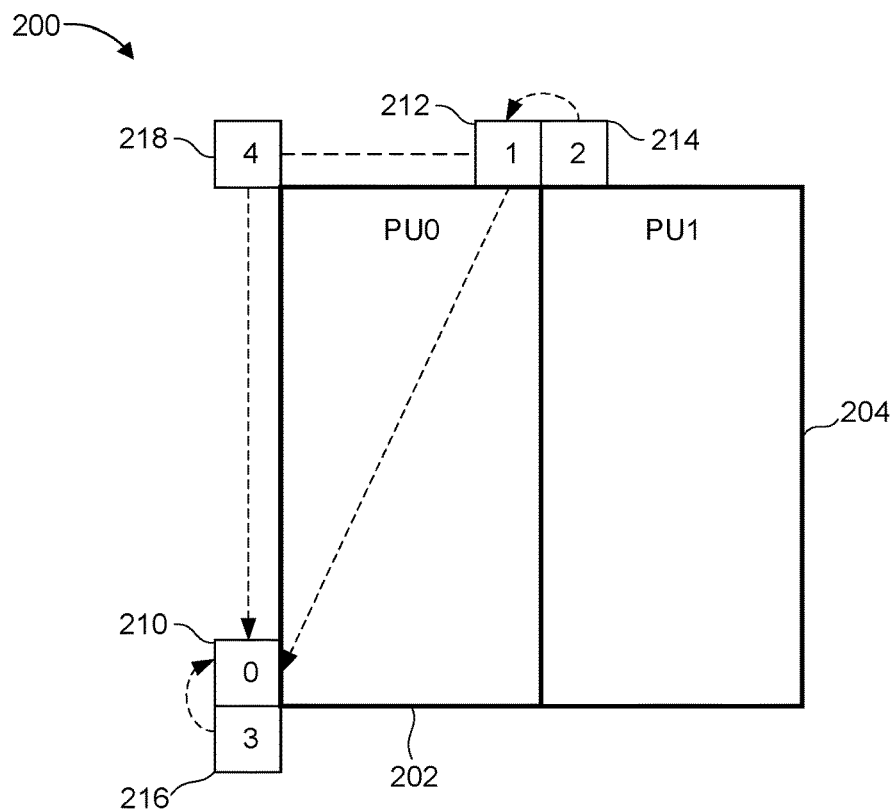
FIG. 2A is a conceptual diagram illustrating example spatial neighboring motion vector candidates for a merge mode, in accordance with some examples.
Figure 2B:
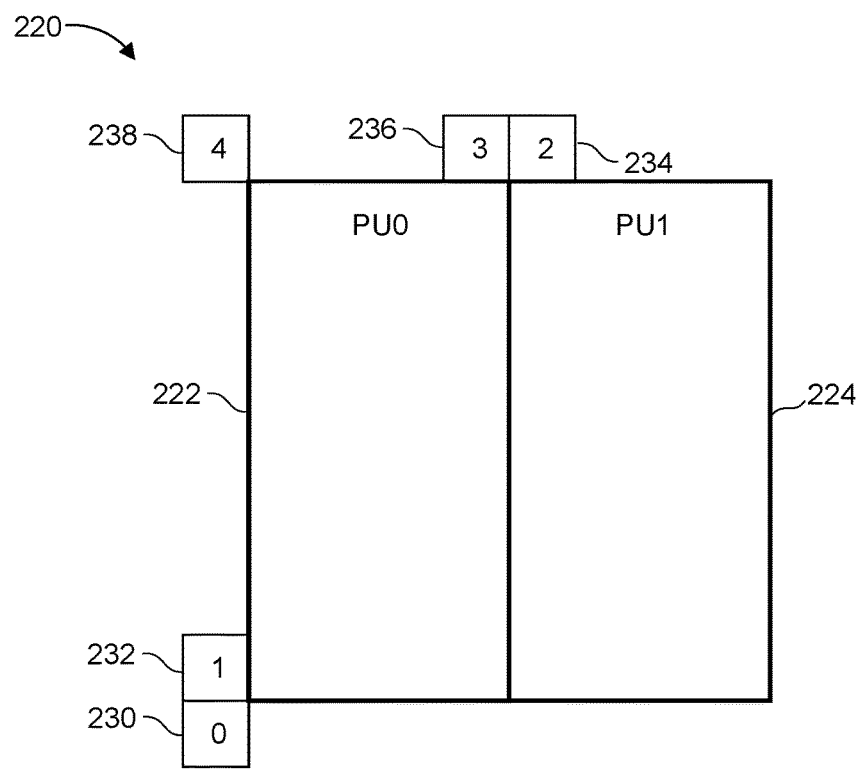
FIG. 2B is a conceptual diagram illustrating example spatial neighboring motion vector candidates for an advanced motion vector prediction (AMVP) mode, in accordance with some examples.

The candidates for both modes can be derived from spatial and/or temporal neighboring blocks. For example, FIG. 2A and FIG. 2B include conceptual diagrams illustrating spatial neighboring candidates. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder can form a merging candidate list by considering merging candidates from various motion data positions. For example, as shown in FIG. 2A, up to four spatial MV candidates can be derived with respect to spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4). In FIG. 2A, block 200 includes PU0 202 and PU1 204. In some examples, when a video coder is to code motion information for PU0 202 using merge mode, the video coder can add motion information from spatial neighboring blocks 210-218 to a candidate list, in the order described above.

In AVMP mode shown in FIG. 2B, the neighboring blocks are divided into two groups: left group including the blocks 0 and 1, and above group including the blocks 2, 3, and 4. In FIG. 2B, the blocks 0, 1, 2, 3, and 4 are labeled, respectively, as blocks 230, 232, 234, 236, and 238. Here, block 220 includes PU0 222 and PU1 224, and blocks 230, 232, 234, 236, and 238 represent spatial neighbors to PU0 222. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
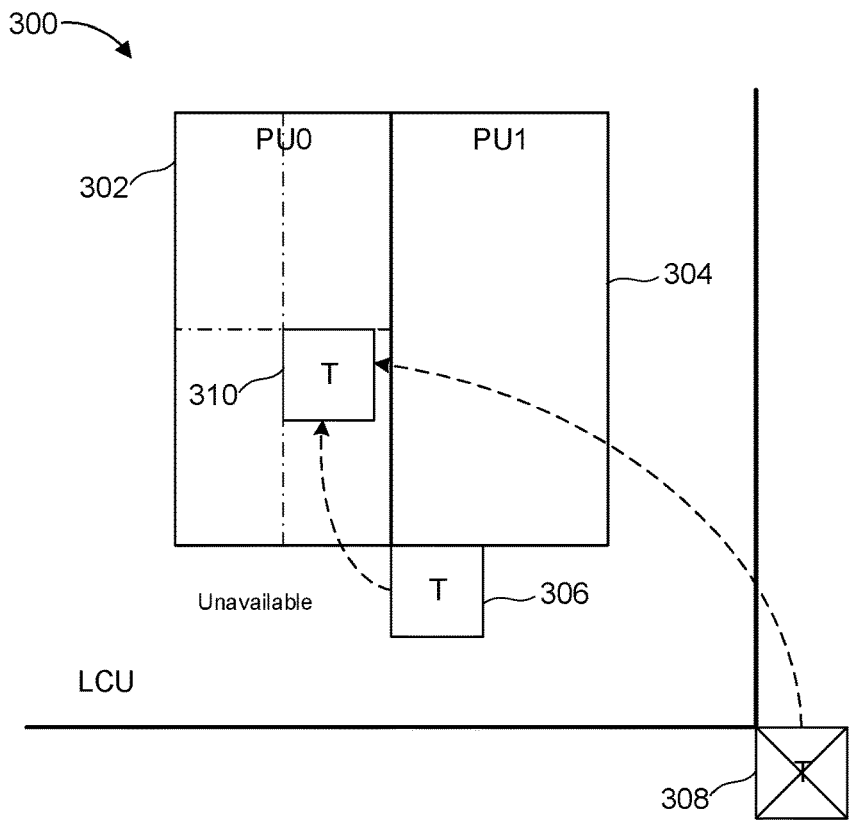
FIG. 3A is a conceptual diagram illustrating an example temporal motion vector predictor (TMVP) candidate, in accordance with some examples.
Figure 3B:
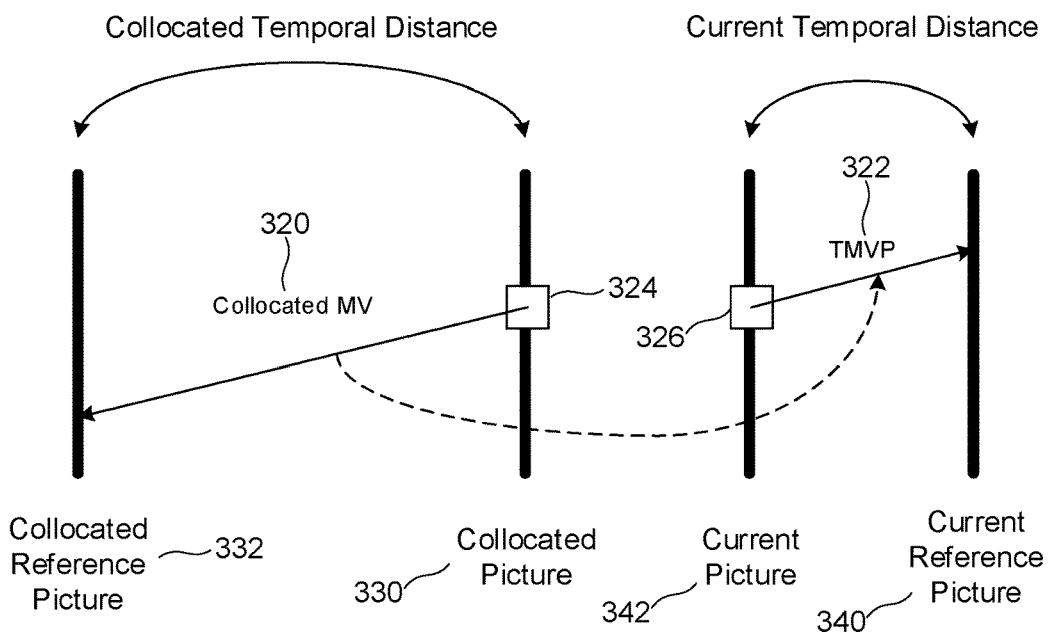
FIG. 3B is a conceptual diagram illustrating an example of motion vector scaling, in accordance with some examples.

FIG. 3A and FIG. 3B include conceptual diagrams illustrating temporal motion vector prediction. FIG. 3A illustrates an example CU 300 including PU0 302 and PU1 304. PU0 302 includes a center block 310 for PU0 302 and a bottom-right block 306 to PU0 302. FIG. 3A also shows an external block 308 for which motion information may be predicted from motion information of PU0 302, as discussed below. FIG. 3B illustrates a current picture 342 including a current block 326 for which motion information is to be predicted. FIG. 3B also illustrates a collocated picture 330 to current picture 342 (including collocated block 324 to current block 326), a current reference picture 342, and a collocated reference picture 332. Collocated block 324 is predicted using collocated motion vector 320, which is used as a temporal motion vector predictor (TMVP) 322 for motion information of block 326.

A video coder can add a temporal motion vector predictor (TMVP) candidate (e.g., TMVP 322), if enabled and available, into a MV candidate list after any spatial motion vector candidates. The process of motion vector derivation for a TMVP candidate is the same for both merge and AMVP modes. In some instances, however, the target reference index for the TMVP candidate in the merge mode is always set to zero.

The primary block location for TMVP candidate derivation is the bottom right block 306 outside of the collocated PU 304, as shown in FIG. 3A, to compensate for the bias to the above and left blocks used to generate spatial neighboring candidates. However, if block 306 is located outside of the current CTB (or LCU) row (e.g., as illustrated by block 308 in FIG. 3A) or if motion information for block 306 is not available, the block is substituted with center block 310 of PU 302.

With reference to FIG. 3B, a motion vector for TMVP candidate 322 can be derived from collocated block 324 of collocated picture 330, indicated in the slice level. Similar to temporal direct mode in AVC, a motion vector of the TMVP candidate may be subject to motion vector scaling, which is performed to compensate for distance differences between current picture 342 and current reference picture 340, and collocated picture 330 and collocated reference picture 332. That is, motion vector 320 can be scaled to produce TMVP candidate 322 based on the distance differences between a current picture (e.g., current picture 342) and a current reference picture (e.g., current reference picture 340), and a collocated picture (e.g., collocated picture 330) and a collocated reference picture (e.g., collocated reference picture 332).

Other aspects of motion prediction are also covered in the HEVC, VVC, and other video coding specifications. For example, one aspect includes motion vector scaling. In motion vector scaling, a value of motion vectors is assumed to be proportional to a distance between pictures in presentation time. In some examples, a first motion vector can be associated with two pictures, including a first reference picture and a first containing picture which includes the first motion vector. The first motion vector can be utilized to predict a second motion vector. For predicting the second motion vector, a first distance between the first containing picture and the first reference picture of the first motion can be calculated based on Picture Order Count (POC) values associated with the first reference picture and the first containing picture.

A second reference picture and a second containing picture may be associated with the second motion vector to be predicted, where the second reference picture can be different from the first reference picture and the second containing picture can be different from the first containing picture. A second distance can be calculated between the second reference picture and the second containing picture based POC values associated with the second reference picture and the second containing picture, where the second distance can be different from the first distance. For predicting the second motion vector, the first motion vector can be scaled based on the first distance and the second distance. For a spatially neighboring candidate, the first containing picture and the second containing picture of the first motion vector and the second motion vector, respectively, can be the same, while the first reference picture and the second reference picture may be different. In some examples, the motion vector scaling can be applied for TMVP and AMVP modes, for the spatial and temporal neighboring candidates.

Another aspect of motion prediction includes artificial motion vector candidate generation. For example, if a motion vector candidate list is not complete, artificial motion vector candidates are generated and inserted at the end of the motion vector candidate list until all candidates are obtained. In merge mode, there are two types of artificial MV candidates: a first type which includes combined candidates derived only for B-slices; and second type which includes zero candidates used only for AMVP if the first type does not provide sufficient artificial candidates. For each pair of candidates that are already in the motion vector candidate list and that have relevant motion information, bi-directional combined motion vector candidates can be derived by a combination of the motion vector of the first candidate referring to a picture in the list 0 and the motion vector of a second candidate referring to a picture in the list 1.

Another aspect of merge and AMVP modes includes a pruning process for candidate insertion. For example, candidates from different blocks may happen to be the same, which decreases the efficiency of a merge and/or AMVP candidate list. A pruning process can be applied to solve this problem. The pruning process includes comparing a candidate against the candidates already present in the current candidate list to avoid inserting identical or duplicate candidates. To reduce the complexity of the comparison, the pruning process can be performed for less than all potential candidates to be inserted in the candidate list.

In some examples, enhanced motion vector predictions can be implemented. For instance, some inter coding tools are specified in video coding standards such as VVC, according to which the candidate list of motion vector prediction or merge prediction for a current block can be derived or refined. Examples of such approaches are described below.

A history-based motion vector prediction (HMVP) is a motion vector prediction method that allows each block to find its MV predictor from a list of MVs decoded from the past in addition to those in immediately adjacent causal neighboring motion fields. For example, using HMVP, one or more MV predictors for a current block can be obtained or predicted from a list of previously decoded MVs in addition to those in immediately adjacent causal neighboring motion fields. The MV predictors in the list of previously decoded MVs are referred to as HMVP candidates. The HMVP candidates can include motion information associated with inter-coded blocks. An HMVP table with multiple HMVP candidates can be maintained during an encoding and/or decoding process for a slice. In some examples, the HMVP table can be dynamically updated. For example, after decoding an inter-coded block, the HMVP table can be updated by adding the associated motion information of the decoded inter-coded block to the HMVP table as a new HMVP candidate. In some examples, the HMVP table can be emptied when a new slice is encountered.

In some cases, whenever there is an inter-coded block, the associated motion information can be inserted into the table in a first-in-first-out (FIFO) fashion as a new HMVP candidate. A constraint FIFO rule can be applied. When inserting an HMVP to the table, a redundancy check can be firstly applied to find whether there is an identical HMVP in the table. If found, that particular HMVP can be removed from the table and all the HMVP candidates afterwards are moved.

In some examples, HMVP candidates can be used in the merge candidate list construction process. In some cases, all HMVP candidates from the last entry to the first entry in the table are inserted after the TMVP candidate. Pruning can be applied on the HMVP candidates. Once the total number of available merge candidates reaches the signaled maximally allowed merge candidates, the merge candidate list construction process can be terminated.

In some examples, HMVP candidates can be used in the AMVP candidate list construction process. In some cases, the motion vectors of the last K HMVP candidates in the table are inserted after the TMVP candidate. In some implementations, only HMVP candidates with the same reference picture as the AMVP target reference picture are used to construct the AMVP candidate list. Pruning can be applied on the HMVP candidates.

FIG. 4 is a block diagram illustrating an example of an HMVP table 400. In some examples, the HMVP table 400 can be implemented as a storage device and/or structure managed using a First-In-First-Out (FIFO) rule. For example, HMVP candidates that include MV predictors can be stored in the HMVP table 400. The HMVP candidates can be stored in an order in which they are encoded or decoded. In an example, the order in which the HMVP candidates are stored in the HMVP table 400 can correspond to a time at which the HMVP candidates are constructed. For example, when implemented in a decoder such as the decoding device 112, an HMVP candidate can be constructed to include motion information of a decoded inter-coded block. In some examples, one or more HMVP candidates from the HMVP table 400 can include the motion vector predictors which can be used for motion vector prediction for a current block to be decoded. In some examples, one or more HMVP candidates can include one or more such previously decoded blocks, which can be stored in the time order in which they were decoded in one or more entries of the HMVP table 400 in a FIFO manner.

An HMVP candidate index 402 is shown to be associated with the HMVP table 400. The HMVP candidate index 402 can identify the one or more entries of the HMVP table 400. The HMVP candidate index 402 is shown to include the index values 0 to 4 according to an illustrative example, where each of the index values of the HMVP candidate index 402 is associated with a corresponding entry. In other examples, the HMVP table 400 can include more or less entries than those shown and described with reference to FIG. 4. As HMVP candidates are constructed, they are populated in the HMVP table 400 in a FIFO manner. For example, as the HMVP candidates are decoded, they are inserted into the HMVP table 400 at one end and moved sequentially through the entries of the HMVP table 400 until they exit the HMVP table 400 from another end. Accordingly, a memory structure such as a shift register can be used to implement the HMVP table 400 in some examples.

In an example, the index value 0 can point to a first entry of the HMVP table 400, where the first entry can correspond to a first end of the HMVP table 400 at which the HMVP candidates are inserted. Correspondingly, the index value 4 can point to a second entry of the HMVP table 400, where the second entry can correspond to second end of the HMVP table 400 from which the HMVP candidates exit or are emptied from the HMVP table 400. Accordingly, an HMVP candidate which is inserted at the first entry at the index value 0 can traverse the HMVP table 400 to make room for newer or more recently decoded HMVP candidates until the HMVP candidate reaches the second entry at the index value 4. Thus, among the HVMP candidates present in the HMVP table 400 at any given time, the HMVP candidate in the second entry at the index value 4 may be the oldest or least recent, while the HMVP candidate in the first entry at the index value 0 may be the youngest or most recent. In general, the HMVP candidate in the second entry may be an older or less recently constructed HMVP candidate than the HMVP candidate in the first entry.

In FIG. 4, different states of the HMVP table 400 are identified with the reference numerals 400A, 400B, and 400C. Referring to the state 400A, HMVP candidates HMVP0 to HMVP4 are shown to be present in entries of the HMVP table 400 at respective index values 4 to 0. For example, HMVP0 may be the oldest or least recent HMVP candidate which was inserted into the HMVP table 400 at the first entry at the index value 0. HMVP0 may be shifted sequentially to make room for the less recently inserted and newer HMVP candidates HMVP1 to HMVP4 until HMVP0 reaches the second entry at the index value 4 shown in the state 400A. Correspondingly, HMVP4 may be the most recent HMVP candidate to be inserted in the first entry at the index value 0. Thus, HMVP0 is an older or less recent HMVP candidate in the HMVP table 400 in relation to HMVP4.

In some examples, one or more of the HMVP candidates HMVP0 to HMVP4 can include motion vector information which can be redundant. For example, a redundant HMVP candidate can include motion vector information that is identical to the motion vector information in one or more other HMVP candidates stored in the HMVP table 400. Since the motion vector information of the redundant HMVP candidate can be obtained from the one or more other HMVP candidates, storing the redundant HMVP candidate in the HMVP table 400 can be avoided. By avoiding the redundant HMVP candidates from being stored in the HMVP table 400, resources of the HMVP table 400 can be utilized more efficiently. In some examples, prior to storing an HMVP candidate in the HMVP table 400, a redundancy check can be performed to determine whether the HMVP candidate would be redundant (e.g., the motion vector information of the HMVP candidate can be compared to the motion vector information of the other HMVP candidates already stored to determine whether there is a match).

In some examples, the state 400B of the HMVP table 400 is a conceptual illustration of the above-described redundancy check. In some examples, the HMVP candidates can be populated in the HMVP table 400 as they are decoded, and the redundancy check can be performed periodically, rather than being performed as a threshold test before the HMVP candidates are stored. For example, as shown in the state 400B, the HMVP candidates HMVP1 and HMVP3 can be identified as redundant candidates (e.g., their motion information is identical to that of one of the other HMVP candidates in the HMVP table 400). The redundant HMVP candidates HMVP1 and HMVP3 can be removed and the remaining HMVP candidates can be shifted accordingly.

For example, as shown in state 400C, the HMVP candidates HMVP2 and HMVP4 are shifted towards higher index values which correspond to older entries, while HMVP0 which is already in the second entry at the end of the HMVP table 400 is not shown to be shifted further. In some examples, shifting the HMVP candidates HMVP2 and HMVP4 can free up space in the HMVP table 400 for newer HMVP candidates. Accordingly, new HMVP candidates HMVP5 and HMVP6 are shown to be shifted into the HMVP table 400, with HMVP6 being the newest or including the most recently decoded motion vector information, and stored in the first entry at the index value 0.

In some examples, one or more of the HMVP candidates from the HMVP table 400 can be used for constructing other candidate lists that can be used for motion prediction of the current block. For example, one or more HMVP candidates from the HMVP table 400 can be added to a merge candidate list, e.g., as additional merge candidates. In some examples, one or more HMVP candidates from the same HMVP table 400 or another such HMVP table can be added to an Advanced Motion Vector Prediction (AMVP) candidate list, e.g., as additional AMVP predictors.

For example, in a merge candidate list construction process some or all of the HMVP candidates stored in the entries of the HMVP table 400 can be inserted in the merge candidate list. In some examples, inserting the HMVP candidates in the merge candidate list can include inserting the HMVP candidates after a temporal motion vector predictor (TMVP) candidate in the merge candidate list. As previously discussed with reference to FIG. 3A and FIG. 3B, the TMVP candidate, if enabled and available, can be added into a MV candidate list after spatial motion vector candidates.

In some examples, the above-described pruning process can be applied on the HMVP candidates in constructing the merge candidate list. For example, once a total number of merge candidates in the merge candidate list reaches a maximum number of allowable merge candidates, the merge candidate list construction process can be terminated, and no more HMVP candidates may be inserted into the merge candidate list. The maximum number of allowable merge candidates in the merge candidate list can be a predetermined number or a number which may be signaled, e.g., from an encoder to a decoder at which the merge candidate list may be constructed.

Figure 5:
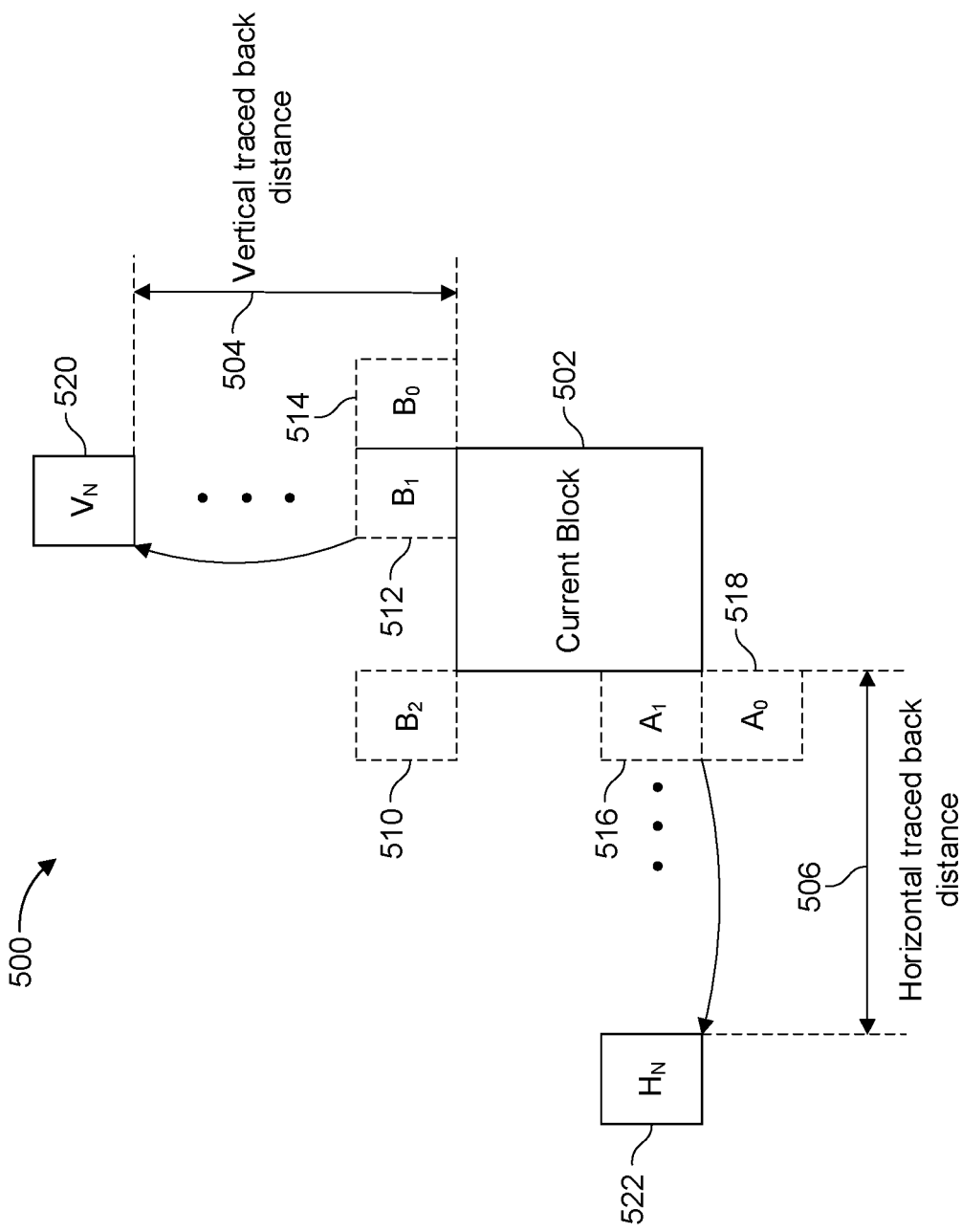
FIG. 5 is a diagram illustrating an example of fetching non-adjacent spatial merge candidates, in accordance with some examples.

In some examples of constructing the merge candidate list, one or more other candidates can be inserted in the merge candidate list. In some examples, the motion information of previously coded blocks which may not be adjacent to the current block can be utilized for more efficient motion vector prediction. For example, non-adjacent spatial merge candidates can be used in constructing the merge candidate list. In some cases, the construction of non-adjacent spatial merge candidates (e.g., described in JVET-K0228, which is hereby incorporated by reference in its entirety and for all purposes) involves derivation of new spatial candidates from two non-adjacent neighboring positions (e.g., from the closest non-adjacent block to the left/above, as illustrated in FIG. 5 and discussed below). The blocks can be limited within a maximum distance of 1 CTU to the current block. The fetching process of non-adjacent candidates starts with tracing the previous decoded blocks in the vertical direction. The vertical inverse tracing stops when an inter block is encountered or the traced back distance reaches 1 CTU size. The fetching process then traces the previous decoded blocks in the horizontal direction. The criterion for stopping the horizontal fetching process depends on whether there is a vertical non-adjacent candidate successfully being fetched or not. If no vertical non-adjacent candidate is fetched, the horizontal fetching process stops when an inter block is encountered or the traced back distance exceed one CTU size threshold. If there is a vertical non-adjacent candidate fetched, then the horizontal fetching process stops when an inter block which contains a different MV from the vertical non-adjacent candidate is encountered or the traced back distance exceeds an CTU size threshold. In some examples, the non-adjacent spatial merge candidates can be inserted before the TMVP candidate in the merge candidate list.

In some examples, the non-adjacent spatial merge candidates can be inserted before the TMVP candidate in the same merge candidate list which can include one or more of the HMVP candidates inserted after the TMVP candidate. Identifying and fetching one or more non-adjacent spatial merge candidates which can be inserted into the merge candidate list will be described with reference to FIG. 5 below.

As further described herein, in some examples, one or more HMVP candidates in the HMVP table 400 can include affine motion vectors generated using affine motion vector prediction. For example, a block can have multiple affine motion vectors calculated using affine motion vector prediction. However, rather than storing the multiple motion vectors for the block in the HMVP table 400, a single affine motion vector can be generated for the block and stored in the HMVP table 400. In some cases, the single affine motion vector can be generated for a specific location and/or corresponding to a specific location of the block. For example, in some cases, an affine motion vector can be generated for a central location of the block, and the affine motion vector generated for the central location of the block can be stored in the HMVP table 400. Thus, instead of storing multiple affine motion vectors for the block, a single affine motion vector is generated for the block and stored in the HMVP table 400.

FIG. 5 is a block diagram illustrating a picture or slice 500 which includes a current block 502 to be coded. In some examples, a merge candidate list can be constructed for coding the current block 502. For example, motion vectors for the current block can be obtained from one or more merge candidates in the merge candidate list. The merge candidate list can include determining non-adjacent spatial merge candidates. For example, the non-adjacent spatial merge candidates can include new spatial candidates derived from two non-adjacent neighboring positions relative to the current block 502.

Several adjacent or neighboring blocks of the current block 502 are shown, including an above left block $B_2$ 510 (above and to the left of the current block 502), an above block $B_1$ 512 (above the current block 502), an above right block $B_0$ 514 (above and to the right of the current block 502), a left block $A_1$ 516 (to the left of the current block 502), and a left below block $A_0$ 518 (to the left of and below the current block 502). In some examples, the non-adjacent spatial merge candidates can be obtained from one the closest non-adjacent block above and/or to the left of the current block.

In some examples, non-adjacent spatial merge candidates for the current block 502 can include tracing previously decoded blocks in a vertical direction (above the current block 502) and/or in a horizontal direction (to the left of the current block 502). A vertical traced back distance 504 indicates a vertical distance relative to the current block 502 (e.g., a top boundary of the current block 502) and a vertical non-adjacent block $V_N$ 520. A horizontal traced back distance 508 indicates a horizontal distance relative to the current block 502 (e.g., a left boundary of the current block 502) and a horizontal non-adjacent block $H_N$ 522. The vertical traced back distance 504 and the horizontal traced back distance 508 are restrained to a maximum distance equal to the size of one coding tree unit (CTU).

Non-adjacent spatial merge candidates such as the vertical non-adjacent block $V_N$ 520 and the horizontal non-adjacent block $H_N$ 522 can be identified by tracing the previous decoded blocks in the vertical direction and the horizontal direction, respectively. For example, fetching the vertical non-adjacent block $V_N$ 520 can include a vertical inverse tracing process to determine whether an inter coded block exists within the vertical traced back distance 504 (constrained to a maximum size of one CTU). If such a block exists, then it is identified as the vertical non-adjacent block $V_N$ 520. In some examples, a horizontal inverse tracing process may be performed subsequent to the vertical inverse tracing process. The horizontal inverse tracing process can include determining whether an inter coded block exists within the horizontal traced back distance 506 (constrained to a maximum size of one CTU), and if such a block is found, it is identified as the horizontal non-adjacent block $H_N$ 522.

In some examples, one or more of the vertical non-adjacent block $V_N$ 520 and the horizontal non-adjacent block $H_N$ 522 can be fetched for use as non-adjacent spatial merge candidates. A fetching process can include fetching the vertical non-adjacent block $V_N$ 520 if the vertical non-adjacent block $V_N$ 520 is identified in the vertical inverse tracing process. The fetching process can then proceed to the horizontal inverse tracing process. If the vertical non-adjacent block $V_N$ 520 is not identified in the vertical inverse tracing process, then the horizontal inverse tracing process can be terminated when an inter coded block is encountered or the horizontal traced back 508 distance exceeds the maximum distance. If the vertical non-adjacent block $V_N$ 520 is identified and fetched, then the horizontal inverse tracing process is terminated when an inter coded block is encountered which contains a different MV than the MV contained in the vertical non-adjacent block $V_N$ 520 or if the horizontal traced back 508 distance exceeds the maximum distance. As previously noted, one or more of the fetched non-adjacent spatial merge candidates such as the vertical non-adjacent block $V_N$ 520 and the horizontal non-adjacent block $H_N$ 522 are added before the TMVP candidate in the merge candidate list.

Referring back to FIG. 4, in some cases, the HMVP candidates can also be used in constructing an AMVP candidate list. In an AMVP candidate list construction process, some or all of the HMVP candidates stored in the entries of the same HMVP table 400 (or a different HMVP table than the one used for the merge candidate list construction) can be inserted in the AMVP candidate list. In some examples, inserting the HMVP candidates in the AMVP candidate list can include inserting a set of entries (e.g., a number of k most recent or least recent entries) of the HMVP candidates after the TMVP candidate in the AMVP candidate list. In some examples, the above-described pruning process can be applied on the HMVP candidates in constructing the AMVP candidate list. In some examples, only those HMVP candidates with a reference picture which is the same as an AMVP target reference picture may be used to construct the AMVP candidate list.

Accordingly, the history-based motion vector predictor (HMVP) prediction mode can involve the use of a history-based lookup table such as the HMVP table 400 which includes one or more HMVP candidates. The HMVP candidates can be used in inter-prediction modes, such as the merge mode and the AMVP mode. In some examples, different inter-prediction modes can use different methods to select HMVP candidates from the HMVP table 400.

Figure 6A:
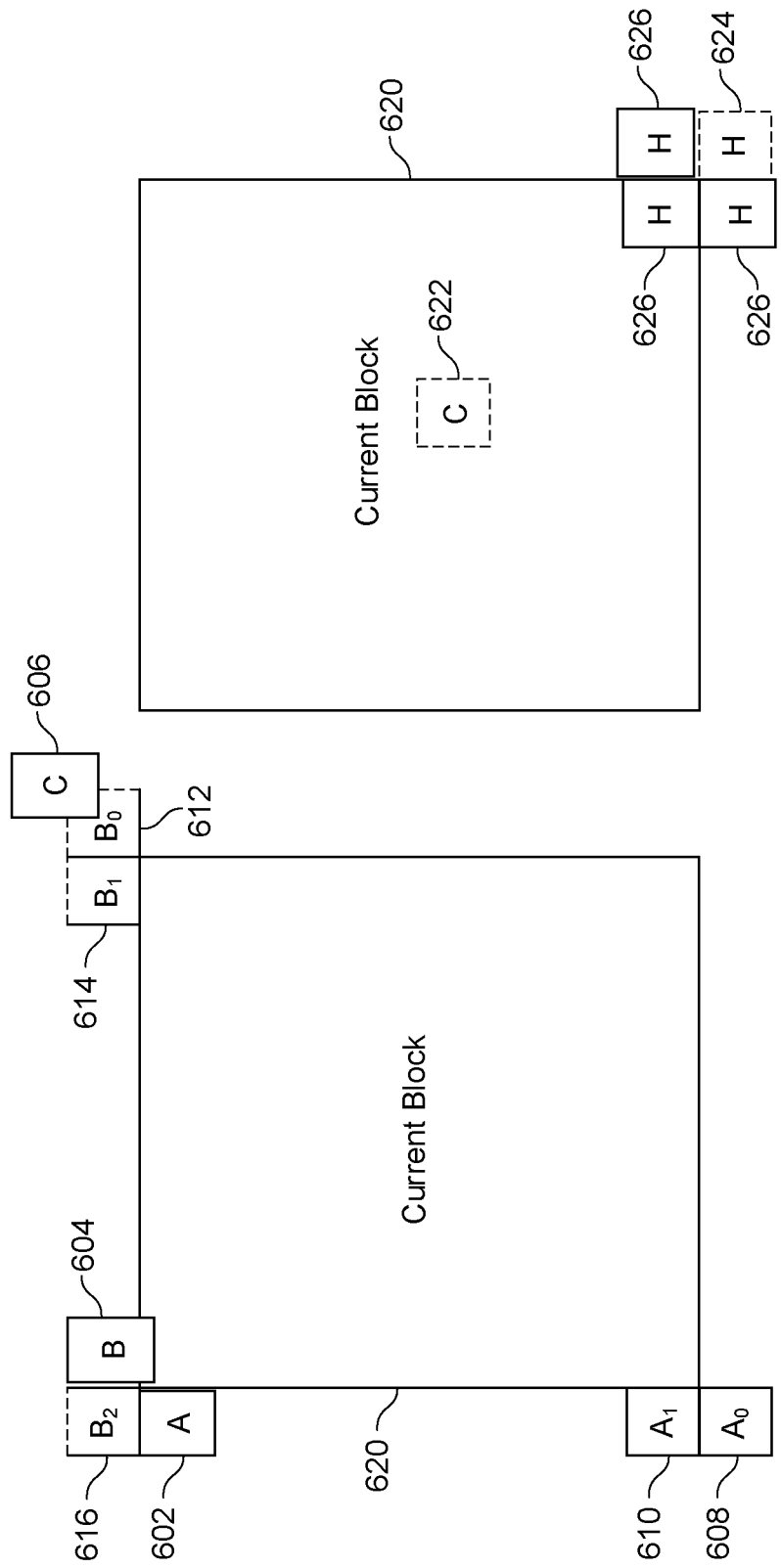
FIG. 6A is a diagram illustrating an example of spatial and temporal locations utilized in MVP prediction, in accordance with some examples.
Figure 6B:
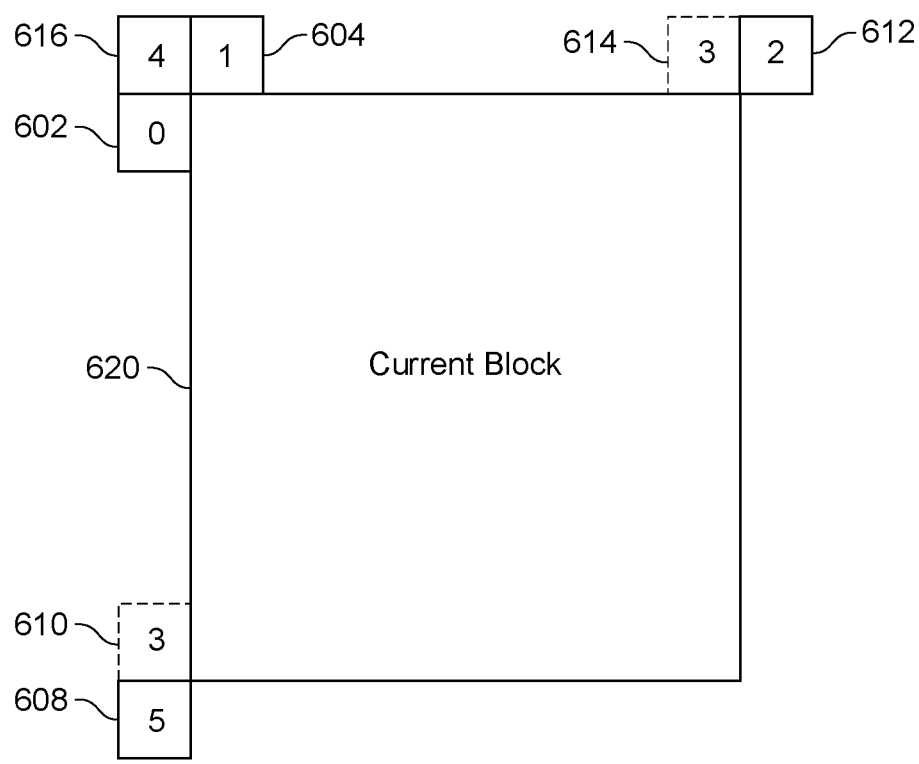
FIG. 6B is a diagram illustrating an example of visiting order for a Spatial-MVP (S-MVP), in accordance with some examples.
Figure 6C:
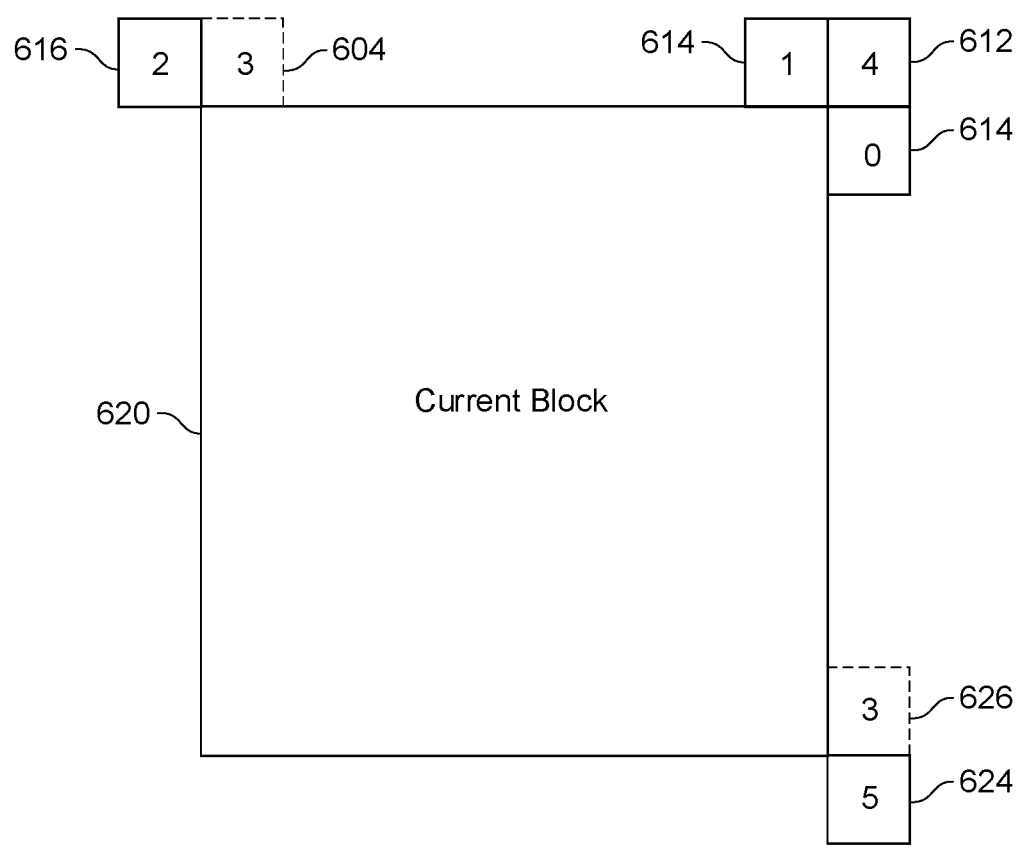
FIG. 6C is a diagram illustrating an example of a spatially inverted pattern alternative (as compared to the order in FIG. 6B), in accordance with some examples.

In some cases, alternative motion vector prediction designs can be used. For example, alternative designs for spatial MVP (S-MVP) prediction and temporal MVP (T-MVP) prediction can be utilized. For instance, in some implementations of merge mode (in some cases merge mode can be referred to as Skip mode or Direct mode), the spatial and temporal MVP candidates shown in FIG. 6A, FIG. 6B, and FIG. 6C can be visited (or searched or selected) in the given order shown in the figures to fill the MVP list. FIG. 6A illustrates locations of MVP candidates. For instance, spatial and temporal locations utilized in MVP prediction are as shown in FIG. 6A. An example of the visiting order (or search order or selection order) for S-MVP is shown in FIG. 6B. A spatially inverted pattern (as compared to the order in FIG. 6B) alternative is shown in FIG. 6C.

In some examples, spatial neighbors utilized as MVP candidates for a current block 620 can include blocks A (602), B (604), (C (606), A1 (610)|B1 (614)), A0 (608), B2 (616), which can be implemented with a two-stage process with the visiting order marked in FIG. 6B and described below.

In some examples, a first group (e.g., Group 1) can include blocks A (602) with visiting order 0, B (604) with visiting order 1, and C (606) with visiting order 2, which can be collocated with B0 (612) in HEVC notation. The first group can also include block A1 (610) with visiting order 3 or B1 (614) with visiting order 3, depending on an availability of an MVP in center block C (606) and a type of block partitioning. A second group (e.g., Group 2) can include blocks A0 (608) with visiting order 5 and B2 (616) with visiting order 4.

Moreover, with reference to FIG. 6A, temporally collocated neighbors utilized as MVP candidates can be block collocated at the center of the current block 620 (center block C 622) and the block H (624) at the most bottom-right location outside of the current block 620. For example, a group can include blocks C 622, H 624. If block H (624) is found to be outside of the collocated picture, one or more fallback H positions (H blocks 626) can be used instead.

In some cases, depending on the block partitioning used and coding order, an inverse S-MVP candidates order can be used, as shown in FIG. 6C. For example, a first group can include blocks 614 with visiting order 0, 614 with visiting order 1, 616 with visiting order 2, 604 with visiting order 3 or 626 with visiting order 3. A second group can include block 612 with visiting order 4 and block 624 with visiting order 5.

In HEVC and earlier video coding standards, only a translational motion model is applied for motion compensation prediction (MCP). For example, a translational motion vector can be determined for each block (e.g., each CU or each PU) of a picture. However, in various cases, there can be additional kinds of motions other than translational motion, including zooming (e.g., zooming in and/or out), rotation, perspective motions, among other irregular motions. Thus, an affine transform motion compensation prediction can also be applied to improve coding efficiency.

For example, in some video coding standards such as HEVC, each block has a single motion vector (e.g., a translational motion vector). However, in affine coding modes, a block can have multiple affine motion vectors (e.g., each sample in a block can have an independent affine motion vector). Moreover, the HMVP table in certain video coding standards such as HEVC is not extended to include affine information. As further described herein, to enable use of affine information, in some cases, translational approximations for an affine motion vector can be derived and stored in the HMVP table. In some examples, for an affine block that may have multiple motion vectors, a single motion vector can be generated for a particular location of the block, such as a central location, and that single motion vector can be stored in the HMVP table to allow such HMVP table to include affine information even if not otherwise supported. This way, affine transform motion compensation prediction can be applied to improve coding efficiency.

Figure 7:
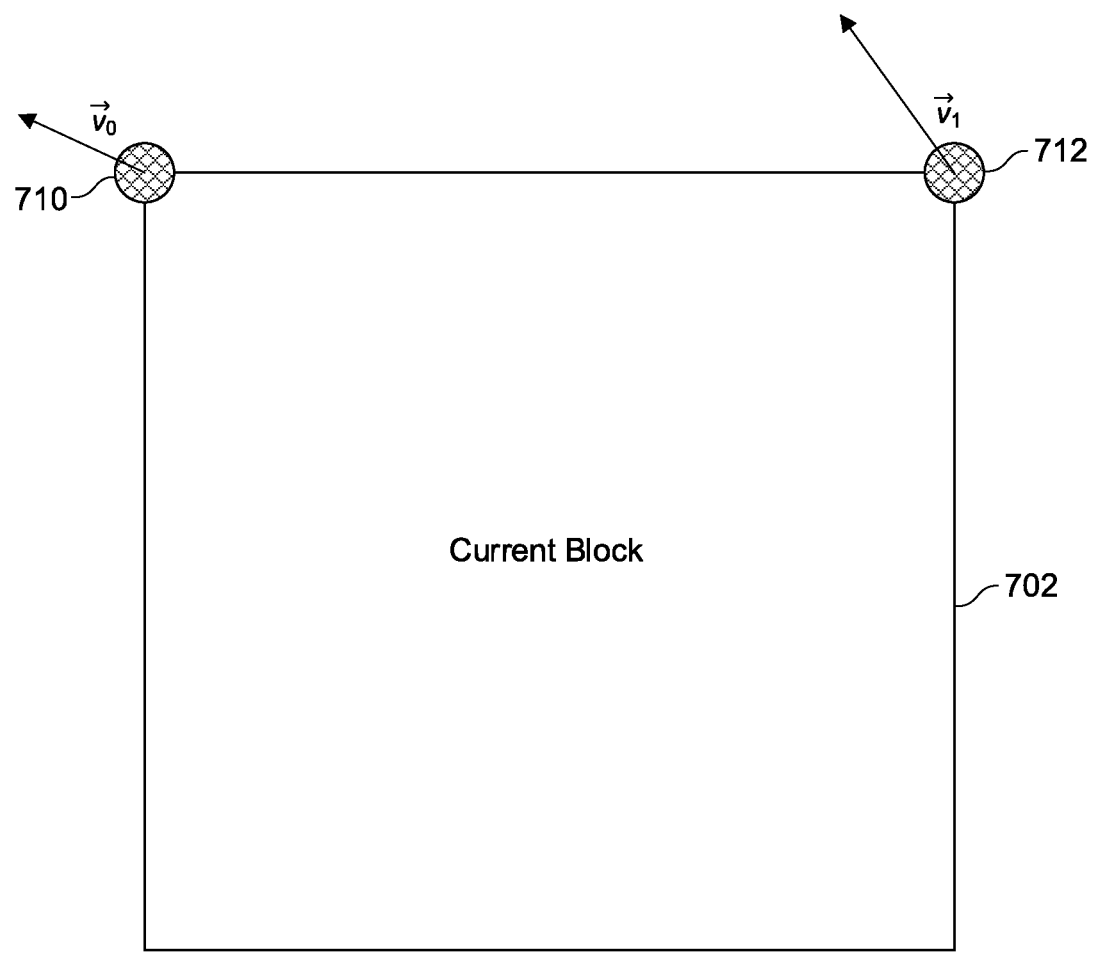
FIG. 7 is a diagram illustrating an example of a simplified affine motion model for a current block, in accordance with some examples.

FIG. 7 is a diagram which illustrates an affine motion field of a current block 702 described by two motion vectors $\vec{v}_0$ and $\vec{v}_1$ of two control points 710 and 712. Using the motion vector $\vec{v}_0$ of the control point 710 and the motion vector $\vec{v}_1$ of the control point 712, the motion vector field (MVF) of the current block 702 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}, \quad \text{Equation (1)}$$

In equation (1), $v_x$ and $v_y$ form the motion vector for each pixel within the current block 702, x and y provide the position of each pixel within the current block 702 (e.g., the top-left pixel in a block can have coordinate or index (x, y)=(0,0)), $(v_{0x}, v_{0y})$ is the motion vector of the top-left corner control point 710, w is the width of the current block 702, and $(v_{1x}, v_{1y})$ is the motion vector of the top-right corner control point 712. The $v_{0x}$ and $v_{1x}$ values are horizontal values for the respective motion vectors, and $v_{0y}$ and $v_{1y}$ values are the vertical values for the respective motion vectors. Additional control points (e.g., four control points, six control points, eight control points, or some other number of control points) can be defined by adding additional control point vectors, for example at the lower corners of the current block 702, the center of the current block 702, or other position in the current block 702.

Equation (1) above illustrates a 4-parameters motion model, where the four affine parameters a, b, c, and d are defined as:

$$a = \frac{(v_{1x} - v_{0x})}{w}; b = \frac{(v_{1y} - v_{0y})}{w};$$

$c=v_{0x}$; and $d=v_{0y}$. Using equation (1), given the motion vector $(v_{0x}, v_{0y})$ of the top-left corner control point 710 and the motion vector $(v_{1x}, v_{1y})$ of the top-right corner control point 712, the motion vector for every pixel of the current block can be calculated using the coordinate (x, y) of each pixel location. For instance, for the top-left pixel position of the current block 702, the value of (x, y) can be equal to (0, 0), in which case the motion vector for the top-left pixel becomes $V_x=v_{0x}$ and $V_y=v_{0y}$. In order to further simplify the MCP, block-based affine transform prediction can be applied.

Figure 8:
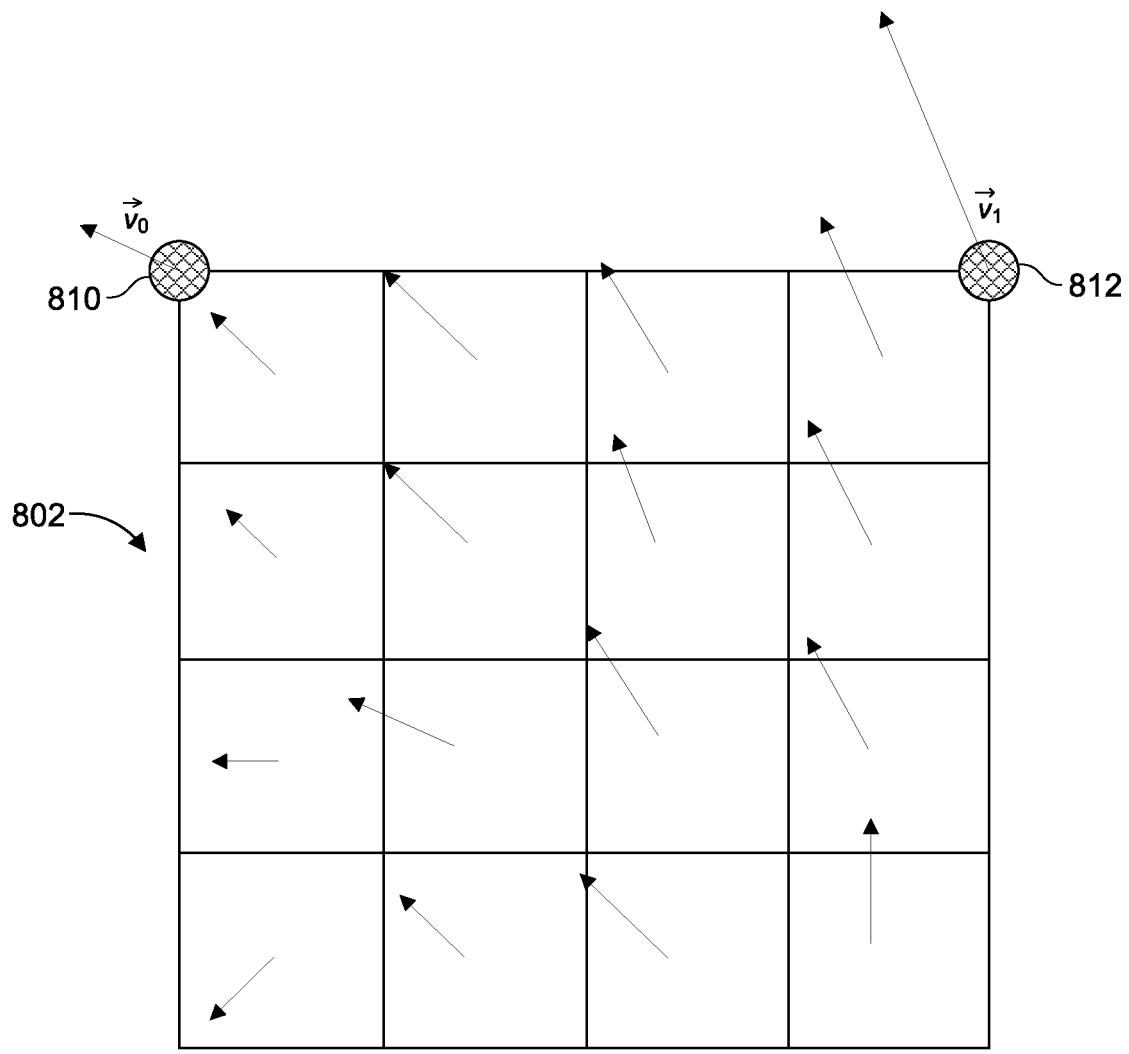
FIG. 8 is a diagram illustrating an example of a motion vector field of sub-blocks of a block, in accordance with some examples.

FIG. 8 is a diagram which illustrates block-based affine transform prediction of a current block 802 divided into sub-blocks. The example shown in FIG. 8 includes a 4×4 partition, with sixteen sub-blocks. Any suitable partition and corresponding number of sub-blocks can be used. A motion vector can then be derived for each sub-block using equation (1). For example, to derive a motion vector of each the 4×4 sub-blocks, the motion vector of the center sample of each sub-block (as shown in FIG. 8) is calculated according to equation (1). The resulting motion vector can be rounded, for example to a 1/16 fraction accuracy or other suitable accuracy (e.g., 1/4, 1/8, or the like). Motion compensation can then be applied using the derived motion vectors of the sub-blocks to generate the prediction of each sub-block. For example, a decoding device can receive the four affine parameters (a, b, c, d) describing the motion vectors $\vec{v}_0$ of the control point 810 and the motion vector $\vec{v}_1$ of the control point 812, and can calculate the per-sub-block motion vector according to the pixel coordinate index describing the location of the center sample of each sub-block. After MCP, the high accuracy motion vector of each sub-block can be rounded, as noted above, and can be saved as the same accuracy as the translational motion vector.

Figure 9:
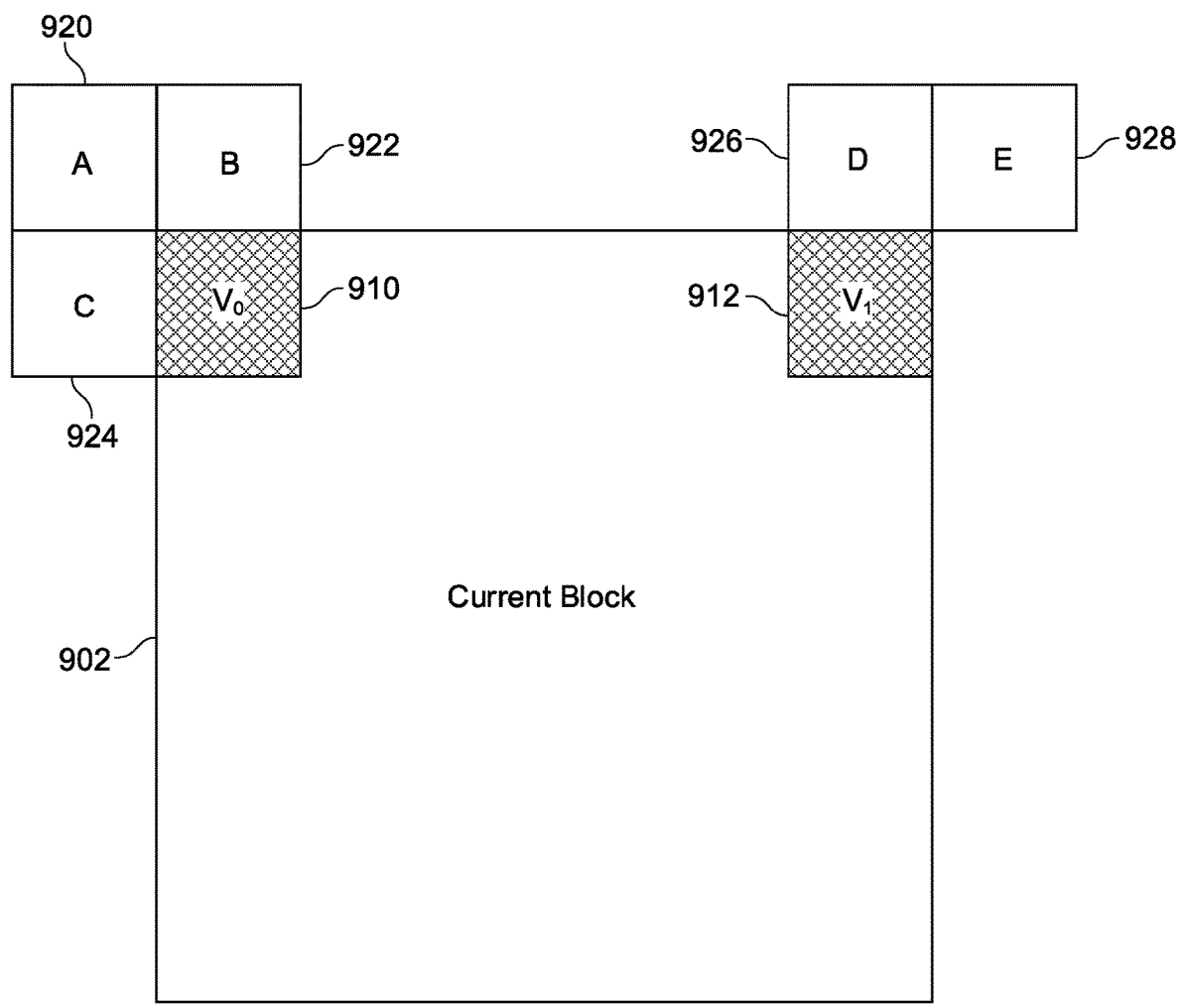
FIG. 9 is a diagram illustrating an example of motion vector prediction in affine inter (AF_INTER) mode, in accordance with some examples.
Figure 10:
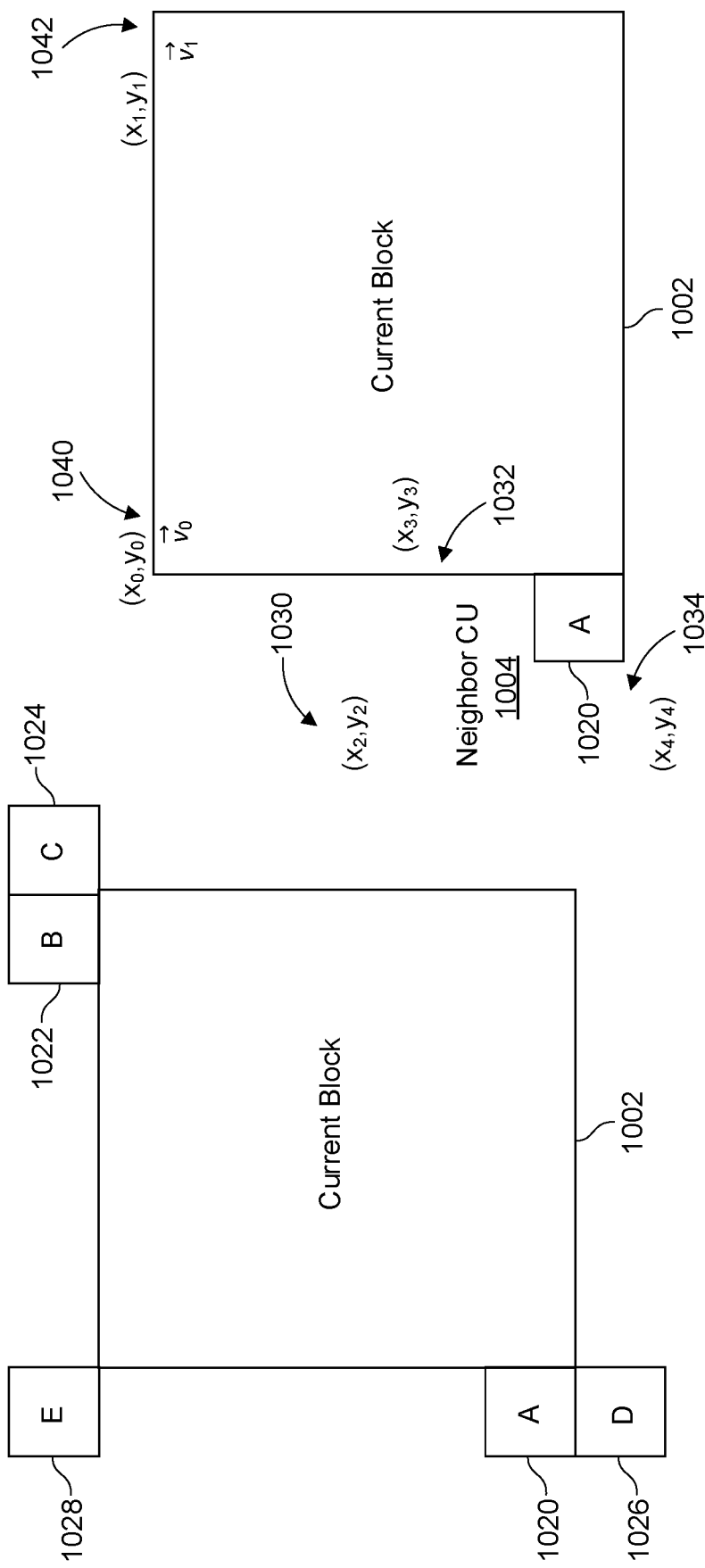
FIG. 10A and FIG. 10B are diagrams illustrating an example of motion vector prediction in affine merge (AF_MERGE) mode, in accordance with some examples.

FIG. 9 is a diagram illustrating an example of motion vector prediction in affine inter (AF_INTER) mode. In JEM, there are two affine motion modes: affine inter (AF_INTER) mode and affine merge (AF_MERGE) mode. In some examples, when a CU has a width and height larger than 8 pixels, AF_INTER mode can be applied. An affine flag can be placed (or signaled) in the bitstream in relation to a block (e.g., at the CU level), to indicate whether AF_INTER mode was applied to the block. As illustrated in the example of FIG. 9, in AF_INTER mode, a candidate list of motion vector pairs can be constructed using neighboring blocks. For example, for a sub-block 910, located in the upper left corner of a current block 902, a motion vector $v_0$ can be selected from a neighboring block A 920 above and to the left of the sub-block 910, neighboring block B 922 above the sub-block 910, and neighboring block C 924 to the left of the sub-block 910. As a further example, for a sub-block 912, located in the upper right corner of the current block 902, a motion vector $v_1$ can be selected from neighboring block D 926 and neighboring block E 928 in the above and the above-right directions, respectively. A candidate list of motion vector pairs can be constructed using the neighboring blocks. For example, given motion vectors $v_A$, $v_B$, $v_C$, $v_D$, and $v_E$ corresponding to blocks A 920, B 922, C 924, D 926, and E 928, respectively, the candidate list of motion vector pairs can be expressed as $\{(v_0, v_1)|v_0=\{v_A, v_B, v_C\}, v_1=\{v_D, v_E\}\}$.

As noted above and as shown in FIG. 9, in AF_INTER mode, the motion vector $v_0$ can be selected from the motion vectors of the blocks A 9720, B 922, or C 924. The motion vector from the neighboring block (block A, B, or C) can be scaled according to the reference list and the relationship among the POC of the reference for the neighboring block, the POC of the reference for the current CU (e.g., the current block 902), and the POC of the current CU. In these examples, some or all of the POCs can be determined from a reference list. Selection of $v_1$ from the neighboring blocks D or E is similar to the selection of $v_0$.

In some cases, if the number of candidate lists is less than two, the candidate list can be padded with motion vector pairs by duplicating each of the AMVP candidates. When the candidate list is larger than two, in some examples, the candidates in the candidate list can first be sorted according to the consistency of the neighboring motion vectors (e.g., consistency can be based on the similarity between the two motion vectors in a motion vector pair candidate). In such examples, the first two candidates are kept and the rest may be discarded.

In some examples, a rate-distortion (RD) cost check can used to determine which motion vector pair candidate is selected as the control point motion vector prediction (CPMVP) of the current CU (e.g., the current block 902). In some cases, an index indicating the position of the CPMVP in the candidate list can be signaled (or otherwise indicated) in the bitstream. Once the CPMVP of the current affine CU is determined (based on the motion vector pair candidate), affine motion estimation can be applied, and the control point motion vector (CPMV) can be determined. In some cases, the difference of the CPMV and the CPMVP can be signalled in the bitstream. Both CPMV and CPMVP include two sets of translational motion vectors, in which case the signaling cost of affine motion information is higher than that of translational motion.

FIG. 10A and FIG. 10B illustrate an example of motion vector prediction in AF_MERGE mode. When a current block 1002 (e.g., a CU) is coded using AF_MERGE mode, a motion vector can be obtained from a valid neighboring reconstructed block. For example, the first block from the valid neighbor reconstructed blocks that is coded with affine mode can be selected as the candidate block. As shown in FIG. 10A, the neighboring block can be selected from among a set of neighboring blocks A 1020, B 1022, C 1024, D 1026, and E 1028. The neighboring blocks may be considered in a particular selection order for being selected as the candidate block. One example of a selection order is the left neighbor (block A 1020), followed by the above neighbor (block B 1022), then the above right neighbor (block C 1024), then the left bottom neighbor (block D 1026), and then the above left neighbor (block E 1028).

As noted above, the neighboring block that is selected can be the first block (e.g., in the selection order) that has been coded with affine mode. For example, block A 1020 may have been coded in affine mode. As illustrated in FIG. 10B, block A 1020 can be included in a neighboring CU 1004. For the neighboring CU 1004, motion vectors for the top left corner ($v_2$ 1030), above right corner ($v_3$ 1032), and left bottom corner ($v_4$ 1034) of the neighboring CU 1004 may have been derived. In this example, a control point motion vector, $v_0$ 1040, for the top left corner of the current block 1002 is calculated according to $v_2$ 1030, $v_3$ 1032, and $v_4$ 1034. The control point motion vector, $v_1$ 1042, for the top right corner of the current block 1002 can then be determined.

Once the control point motion vectors (CPMV), $v_0$ 1040 and $v_1$ 1042, of the current block 1002 have been derived, equation (1) can be applied to determine a motion vector field for the current block 1002. In order to identify whether the current block 1002 is coded with AF_MERGE mode, an affine flag can be included in the bitstream when there is at least one neighboring block coded in affine mode.

In many cases, the process of affine motion estimation includes determining affine motion for a block at the encoder side by minimizing the distortion between the original block and the affine motion predicted block. As affine motion has more parameters than translational motion, affine motion estimation can be more complicated than translational motion estimation. In some cases, a fast affine motion estimation method based on Taylor expansion of signal can be performed to determine the affine motion parameters (e.g., affine motion parameters a, b, c, d in a 4-parameters model).

The fast affine motion estimation can include a gradient-based affine motion search. For example, given a pixel value $l_t$ at time t (with t0 being the time of the reference picture), the first order Taylor expansion for the pixel value $l_t$ can be determined as:

$$I_t = I_{t0} + \frac{\partial I_{t0}}{\partial t}(t - t0) = \quad \text{Equation (2)}$$

$$I_{t0} + \frac{\partial I_{t0}}{\partial x} \cdot \frac{\partial x}{\partial t} \cdot (t - t_0) + \frac{\partial I_{t0}}{\partial y} \cdot \frac{\partial y}{\partial t} \cdot (t - t_0)$$

Where $$\frac{\partial I_{t0}}{\partial x} \text{ and } \frac{\partial I_{t0}}{\partial y}$$

are the pixel gradient $G_{0x}$, $G_{0y}$ in the x and y directions, respectively, while $$\frac{\partial x}{\partial t} \cdot (t - t_0) \text{ and } \frac{\partial y}{\partial t} \cdot (t - t_0)$$

indicate the motion vector components $V_x$ and $V_y$ for the pixel value $I_t$. The motion vector for the pixel $I_t$ in the current block points to a pixel $I_{to}$ in the reference picture.

The equation (2) can be rewritten as equation (3) as follows:

$$I_t = I_{to} + G_{x0} \cdot V_x + G_{y0} \cdot V_y \quad \text{Equation (3)}$$

The affine motion $V_x$ and $V_y$ for the pixel value $I_t$ can then be solved by minimizing the distortion between the prediction $(I_{to} + G_{x0} \cdot V_x + G_{y0} \cdot V_y)$ and the original signal. Taking 4-parameters affine model as an example, $$V_x = a \cdot x - b \cdot y + c \quad \text{Equation (4)}$$

$$V_y = b \cdot x + a \cdot y + d, \quad \text{Equation (5)}$$

where x and y indicate the position of a pixel or sub-block. Taking equations (4) and (5) into equation (3), and then minimizing the distortion between original signal and the prediction using equation (3), the solution of affine parameters a, b, c, d can be determined:

$$\{a,b,c,d\} = \arg\min\{\Sigma_{i \in current\ template}(I_t^i - T_{t0}^i - G_{x0}^i \cdot (a \cdot x + b \cdot y + c) - G_{y0}^i \cdot (b \cdot x - a \cdot y + d))^2\} \quad \text{Equation (6)}$$

Once the affine motion parameters are determined, which define the affine motion vectors for the control points, the per-pixel or per-sub-block motion vectors can be determined using the affine motion parameters (e.g., using equations (4) and (5), which are also represented in equation (1)). Equation (3) can be performed for every pixel of a current block (e.g., a CU). For example, if a current block is 16 pixels×16 pixels, the least squares solution in equation (6) can then be used to derive the affine motion parameters (a, b, c, d) for the current block by minimizing the overall value over the 256 pixels.

Any number of parameters can be used in affine motion models for video data. For instance, a 6-parameters affine motion or other affine motion can be solved in the same way as that described above for the 4-parameters affine motion model. For example, a 6-parameters affine motion model can be described as:

$$\begin{cases} v_x = ax + by + e \\ v_y = cx + dy + f \end{cases} \quad \text{Equation (7)}$$

In equation (7), $(v_x, v_y)$ is the motion vector at the coordinate (x, y), and a, b, c, d, e, and f are the six affine parameters. The affine motion model for a block can also be described by the three motion vectors (MVs) $\vec{v}_0 = (v_{0x}, v_{0y})$, $\vec{v}_1 = (v_{1x}, v_{1y})$, and $\vec{v}_2 = (v_{2x}, v_{2y})$ at three corners of the block.

Figure 11:
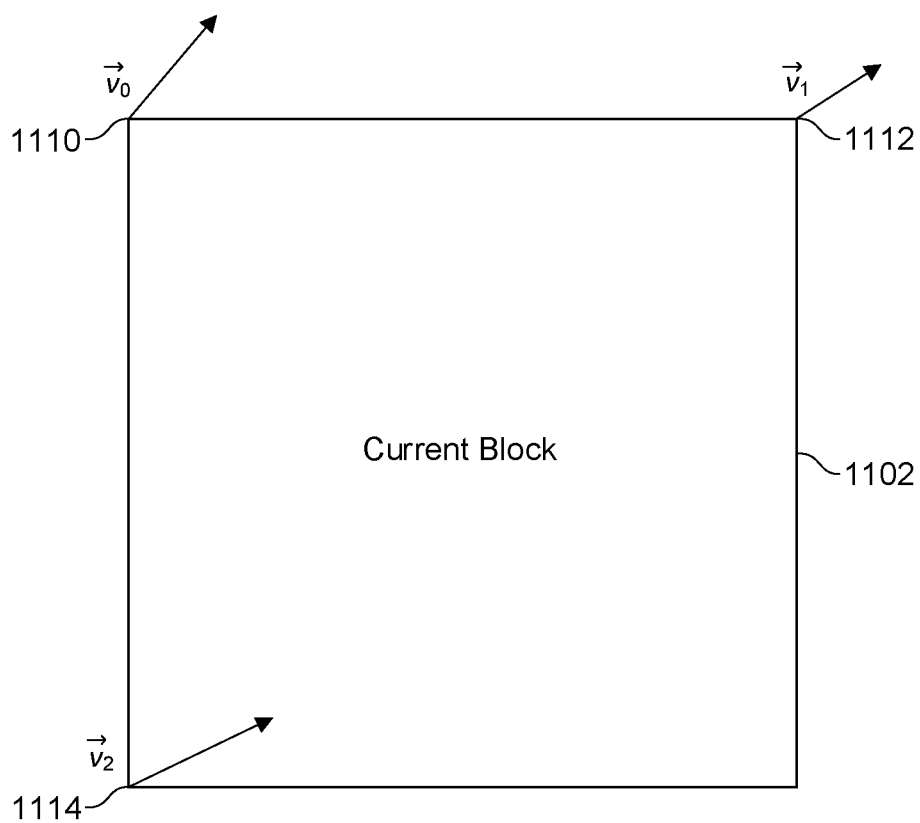
FIG. 11 is a diagram illustrating an example of an affine motion model for a current block, in accordance with some examples.

FIG. 11 is a diagram which illustrates an affine motion field of a current block 1102 described by three motion vectors at three control points 1110, 1112, and 1114. The motion vector $\vec{v}_0$ is at the control point 1110 located at the top-left corner of the current block 1102, the motion vector $\vec{v}_1$ is at the control point 1112 located at the top-right corner of the current block 1102, and the motion vector $\vec{v}_2$ is at the control point 1114 located at the bottom-left corner of the current block 1102. The motion vector field (MVF) of the current block 1102 can be described by the following equation:

$$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad \text{Equation (8)}$$

Equation (8) represents a 6-parameters affine motion model where w and h are the width and height of the current block 1102.

While a 4-parameters motion model was described with reference to equation (1) above, a simplified 4-parameters affine model using the width and the height of the current block can be described by the following equation:

$$\begin{cases} v_x = ax - by + e \\ v_y = bx + ay + f \end{cases} \quad \text{Equation (9)}$$

The simplified 4-parameters affine model for a block based on equation (9) can be described by two motion vectors $\vec{v}_0 = (v_{0x}, v_{0y})$ and $\vec{v}_1 = (v_{1x}, v_{1y})$ at two of four corners of the block. The motion field can then be described as:

$$\begin{cases} v_x = \frac{(v_{1x} - v_{0x})}{w}x - \frac{(v_{1y} - v_{0y})}{h}y + v_{0x} \\ v_y = \frac{(v_{1y} - v_{0y})}{w}x + \frac{(v_{1x} - v_{0x})}{h}y + v_{0y} \end{cases} \quad \text{Equation (10)}$$

As previously mentioned, the motion vector $\vec{v}_i$ is referred to herein as a control point motion vector (CPMV). The CPMVs for the 4-parameters affine motion model are not necessarily the same as the CPMVs for the 6-parameters affine motion model. In some examples, different CPMVs can be selected for the affine motion model.

Figure 12:
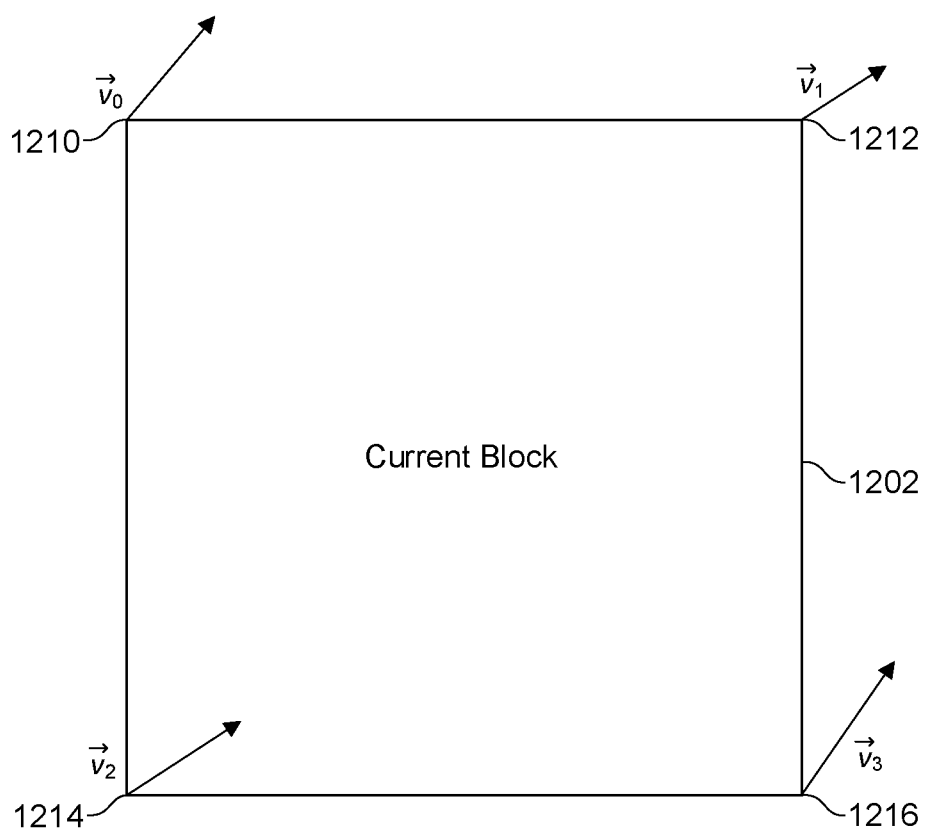
FIG. 12 is a diagram illustrating another example of an affine motion model for a current block, in accordance with some examples.

FIG. 12 is a diagram which illustrates selection of control point vectors for an affine motion model of a current block 1202. Four control points 1210, 1212, 1214, and 1216 are illustrated for the current block 1202. The motion vector $\vec{v}_0$ is at the control point 1210 located at the top-left corner of the current block 1202, the motion vector $\vec{v}_1$ is at the control point 1212 located at the top-right corner of the current block 1202, the motion vector $\vec{v}_2$ is at the control point 1214 located at the bottom-left corner of the current block 1202, and the motion vector $\vec{v}_3$ is at the control point 1216 located at the bottom-right corner of the current block 1202.

In an example, for a 4-parameters affine motion model (according to either equation (1) or equation (10)), control point pairs can be selected from any two of the four motion vectors $\{\vec{v}_0, \vec{v}_1, \vec{v}_2, \vec{v}_3\}$. In another example, for a 6-parameters affine motion model, the control point pairs can be selected from any three of the four motion vectors $\{\vec{v}_0, \vec{v}_1, \vec{v}_2, \vec{v}_3\}$. Based on the selected control point motion vectors, the other motion vectors for the current block 1202 can be calculated, for example, using the derived affine motion model.

In some examples, alternative affine motion model representations can also be used. For instance, an affine motion model based on delta MVs can be represented by an anchor MV $\vec{v}_0$ at a coordinate $(x_0, y_0)$, a horizontal delta MV $\nabla \vec{v}_h$, and a vertical delta MV $\nabla \vec{v}_v$. In general, a MV $\vec{v}$ at the coordinate $(x, y)$ can be calculated as $\vec{v}=\vec{v}_0+x^*\nabla\vec{v}_h+y^*\Delta\vec{v}_v$.

In some examples, the affine motion model representation based on CPMVs can be converted to the alternative affine motion model representation with delta MVs. For example, $\vec{v}_0$ in the delta MV affine motion model representation is the same as the top-left CPMV, $\nabla\vec{v}_h=(\vec{v}_1-\vec{v}_0)/w$, $\nu\vec{v}_v=(\vec{v}_2-\vec{v}_0)/h$. It is to be noted that for these vector operations, the addition, division, and multiplication are applied element wise.

In some examples, affine motion vector prediction can be performed using affine motion predictors. In some examples, the affine motion predictors for a current block can be derived from the affine motion vectors or normal motion vectors of the neighboring coded blocks. As described above, the affine motion predictors can include inherited affine motion vector predictors (e.g., inherited using affine merge (AF_MERGE) mode) and constructed affine motion vector predictors (e.g., constructed using affine inter (AF_INTER) mode).

An inherited affine motion vector predictor (MVP) uses one or more affine motion vectors of a neighboring coded block to derive the predicted CPMVs of a current block. For the inherited affine the current block may share the same affine motion model as the neighboring coded block. The neighboring coded block is referred to as a neighboring block or a candidate block. The neighboring block can be selected from different spatial or temporal neighboring locations.

Figure 13:
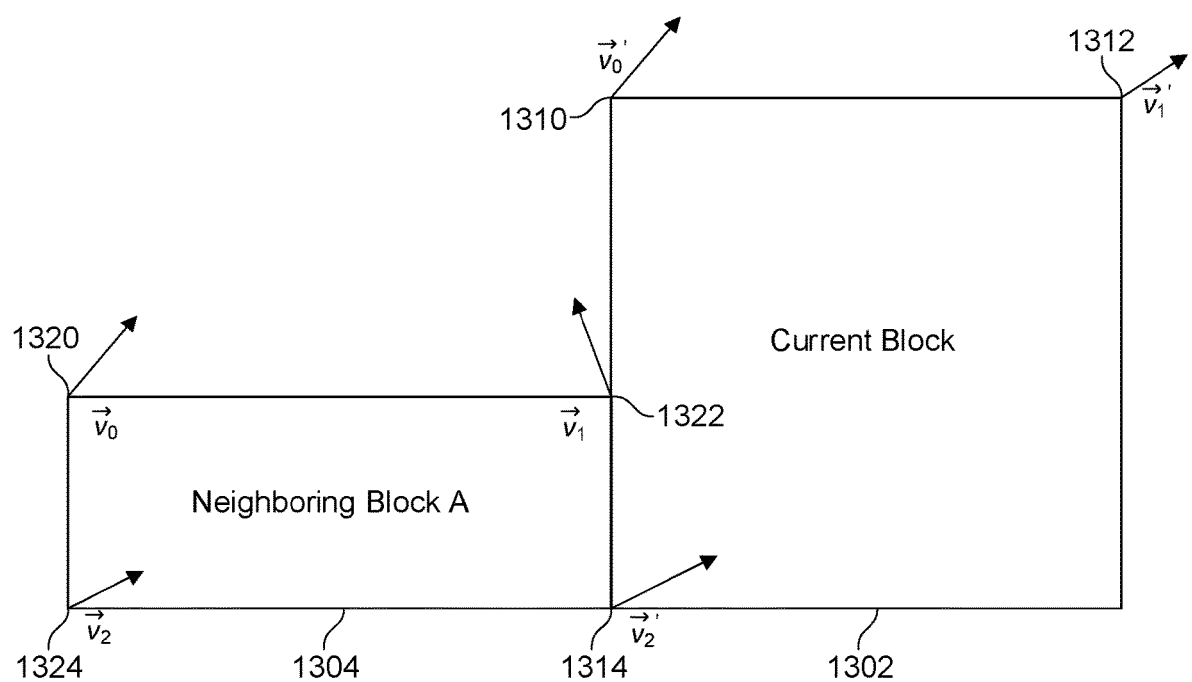
FIG. 13 is a diagram illustrating an example of current block and a candidate block, in accordance with some examples.

FIG. 13 is a diagram illustrating an inherited affine MVP of a current block 1302 from a neighboring block 1302 (block A). The affine motion vectors of the neighboring block 1302 are represented in terms of the respective motion vectors $\{\vec{v}_0, \vec{v}_1, \vec{v}_2\}$ at the control points 1320, 1322, and 1324 as follows: $\vec{v}_0=(v_{0x}, v_{0y})$, $\vec{v}_1=(v_{1x}, v_{1y})$, $\vec{v}_2=(v_{2x}, v_{2y})$. In an example, the size of the neighboring block 1304 can be represented by the parameters (w, h) where w is the width and h is the height of the neighboring block 1304. The coordinates of control points of the neighboring block 1304 are represented as (x0, y0), (x1, y1), and (x2, y2). The affine motion vectors $\vec{v}'_0=(v_{0x}', v_{0y}')$, $\vec{v}'_0=(v_{1x}', v_{1y}')$, $\vec{v}'_2=(v_{2x}', v_{2y}')$ can be predicted for the current block 1302 at the respective control points 1310, 1312, and 1314. The predicted affine motion vectors $\vec{v}'_0=(v_{0x}', v_{0y}')$, $\vec{v}'_1=(v_{1x}', v_{1y}')$, $\vec{v}'_2=(v_{2x}', v_{2y}')$ for the current block 1302 can be derived by replacing (x, y) in equation (8) with the coordinate difference between the control points of the current block 1302 and the top-left control point of the neighboring block 1304 as described in the following equations:

$$\begin{cases} v'_{0x} = \frac{(v_{1x}-v_{0x})}{w}(x0'-x0) + \frac{(v_{2x}-v_{0x})}{h}(y0'-y0) + v_{0x} \\ v'_{0y} = \frac{(v_{1y}-v_{0y})}{w}(x0'-x0) + \frac{(v_{2y}-v_{0y})}{h}(y0'-y0) + v_{0y} \end{cases} \quad \text{Equation (11)}$$

$$\begin{cases} v'_{1x} = \frac{(v_{1x}-v_{0x})}{w}(x1'-x0) + \frac{(v_{2x}-v_{0x})}{h}(y1'-y0) + v_{0x} \\ v'_{1y} = \frac{(v_{1y}-v_{0y})}{w}(x1'-x0) + \frac{(v_{2y}-v_{0y})}{h}(y1'-y0) + v_{0y} \end{cases} \quad \text{Equation (12)}$$

$$\begin{cases} v'_{2x} = \frac{(v_{1x}-v_{0x})}{w}(x2'-x0) + \frac{(v_{2x}-v_{0x})}{h}(y2'-y0) + v_{0x} \\ v'_{2y} = \frac{(v_{1y}-v_{0y})}{w}(x2'-x0) + \frac{(v_{2y}-v_{0y})}{h}(y2'-y0) + v_{0y} \end{cases} \quad \text{Equation (13)}$$

In equations (11)-(13), (x0', y0'), (x1', y1'), and (x2', y2') are the coordinates of control points of the current block. In some examples, the predicted affine motion may also be represented with delta MVs, $\vec{v}'_0=v_{0x}+(x0'-x0)^*\nabla\vec{v}_h+(y0'-y0)^*\nabla\vec{v}_v$, $\vec{v}'_v=v_{0x}+(x1'-x0)^*\nabla\vec{v}_h+(y1'-y0)^*\nabla\vec{v}_v$, and $\vec{v}'_2=v_{0x}+(x2'-x0)^*\nabla\vec{v}_h+(y2'-y0)^*\nabla\vec{v}_v$.

Similarly, if the affine motion model of the neighboring coded block (e.g., the neighboring block 1304) is a 4-parameters affine motion model, then the equation (10) can be applied in deriving the affine motion vectors at the control points for the current block 1302. In some examples, using the equation (10) for obtaining the 4-parameters affine motion model can include avoiding the equation (13) above.

Figure 14:
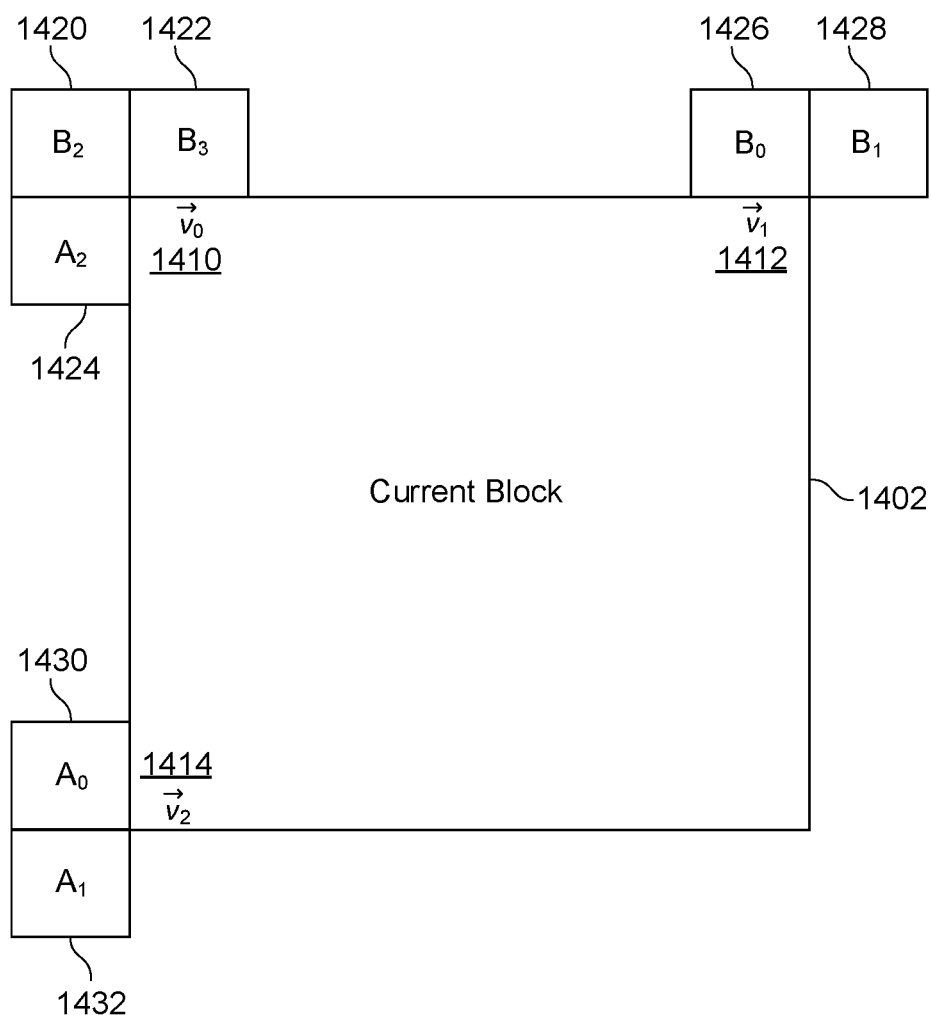
FIG. 14 is a diagram illustrating an example of current block, control points of the current block, and candidate blocks, in accordance with some examples.

FIG. 14 is a diagram which illustrates possible locations for a neighboring candidate block for use in the inherited affine MVP model for a current block 1402. For example, the affine motion vectors $\{\vec{v}_0, \vec{v}_1, \vec{v}_2\}$ at the control points 1410, 1412, and 1414 of the current block can be derived from one of the neighboring blocks 1430 (block A0), 1426 (block B0), 1428 (block B1), 1432 (block A1) and/or 1420 (block B2). In some cases, the neighboring blocks 1424 (block A2) and/or 1422 (block B3) can also be used. More specifically, the motion vector $\vec{v}_0$ at the control point 1410 located at the top left corner of the current block 1402 can be inherited from the neighboring block 1420 (block B2) located above and to the left of the control point 1410, the neighboring block 1422 (block B3) located above the control point 1410, or from the neighboring block 1424 (block A2) located to the left of the control point 1410; the motion vector $\vec{v}_1$ at the control point 1412 located at the top right corner of the current block 1402 can be inherited from the neighboring block 1426 (block B0) located above the control point 1410 or the neighboring block 1428 (block B1) located above and to the right of the control point 1410; and the motion vector $\vec{v}_{21}$ at the control point 1414 located at the bottom left corner of the current block 1402 can be inherited from the neighboring block 1430 (block A0) located to the left of the control point 1410 or the neighboring block 1432 (block A1) located to the left and below the control point 1410.

In some video coding standards, the HMVP buffer (e.g., the HMVP table) cannot be updated with motion information utilized for CU prediction with an affine motion model, and is only updated with motion information from one or more regular inter-coded CUs. However, with the introduction of more complex coding tools, the granularity of the coding blocks can be as small as 4×4. Even though the CU size for affine mode (using an affine motion model) in some cases may be constrained to be at least 8×8, considering high definition (HD) sequence with 2K resolution, ultra-high definition (UHD) with 4K resolution, or other high resolution videos, such a small affine coded block that may be located close to a translational coded CU can be helpful in providing useful information for the prediction of the motion information in the translational coded CU. Accordingly, as further described herein, the approaches herein can allow motion information from one or more affine coded CUs to be included in the HMVP table used for regular inter-prediction mode.

In some examples, systems, methods (also referred to as processes), and computer-readable media are provided for improving history-based motion vector prediction. For example, in some cases, an HMVP table can be updated with motion information produced and/or utilized in CU coding using an affine motion model. In some implementations, the HMVP table can be updated with motion information made available in an affine coded block (e.g., CU, PU, or other block), which may include motion information associated with control points of an affine block, or with sub-block motion vector information, which is derived from control points of an affine block, or with motion information derived from a spatio- and/or temporal-neighborhood of the affine coded block, or with motion information used as a predictor for affine coded block, e.g., output of the MVP produced from affine merge candidate.

In some cases, a history table that contains the motion vector and reference index of one or more previously-decoded CUs can be defined as HMVPCandList. In a first illustrative example, the top-left CPMV of an affine coded block and the corresponding reference index denoted as CPMV_top_left_info can be inserted into the history table as follows: HMVPCandList=CPMV_top_left_info.

In another illustrative example, the top-right CPMV of an affine coded block and the corresponding reference index denoted as CPMV_top_right_info can be inserted into the history table as follows: HMVPCandList=CPMV_top_right_info.

In some cases, an affine coded CU can be divided into sub-blocks and a motion vector can be derived for each of the sub-blocks. When the affine CU size is large (e.g., greater than a threshold size, such as 8×8, 8×16, 16×8, 16×16, or other size), a particular CPMV from a given corner (e.g., a top-left corner, a top-right corner, or other corner) can be quite different as compared to the motion of a sub-block that is farther away. Thus, in some cases, to generate a representative motion vector for the block, a CPMV calculated can be used as a representation of the motion information of the whole CU. Since the center position of the whole CU can provide an average of the overall motion information of each of the sub-blocks, in some examples, the motion vector derived using the center CU position can be inserted into the history table.

Figure 15:
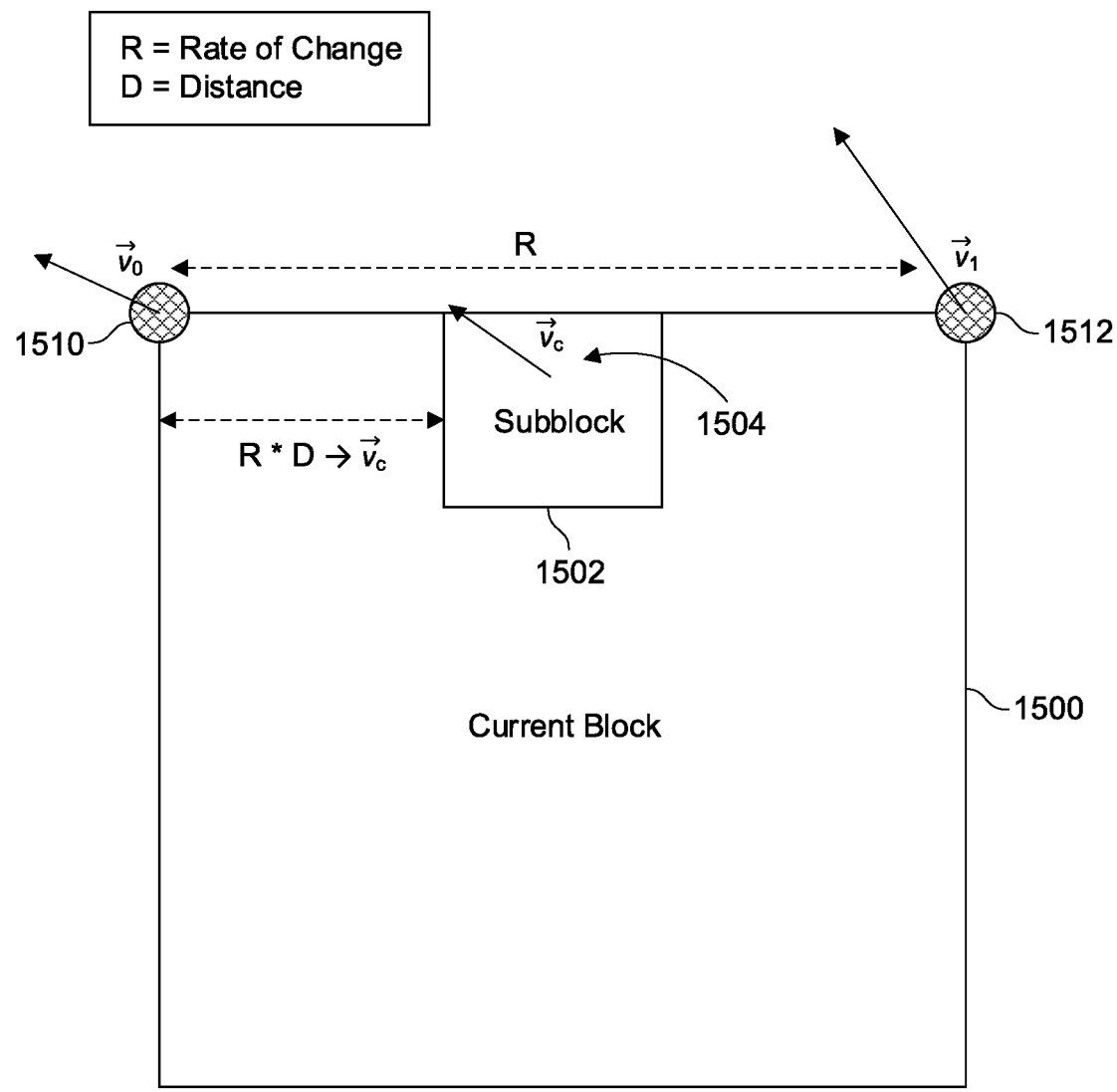
FIG. 15 is a diagram illustrating an example motion vector estimated for an affine coded block and corresponding to a center position of the coded block, in accordance with some examples.

FIG. 15 is a diagram illustrating an example motion vector estimated for an affine coded block and corresponding to a center position of the coded block. In this example, the current block 1500 is an affine coded block. Motion vectors $\vec{v}_0$ and $\vec{v}_1$ correspond to control points 1510 and 1512. Specifically, motion vector $\vec{v}_0$ represents a control point motion vector (CPMV) associated with top-left corner control point 1510, and motion vector $\vec{v}_1$ represents a CPMV associated with top-right corner control point 1512.

Moreover, in some examples, motion vectors $\vec{v}_0$ and $\vec{v}_1$ can have respective horizontal and vertical values. For example, the $v_{0x}$ and $v_{1x}$ values of motion vectors $\vec{v}_0$ and $\vec{v}_1$ can be horizontal values for the respective motion vectors (e.g., motion vectors $\vec{v}_0$ and $\vec{v}_1$), and $v_{0y}$ and $v_{1y}$ values can be the vertical values for the respective motion vectors (e.g., motion vectors $\vec{v}_0$ and $\vec{v}_1$). In some cases, additional control points (e.g., four control points, six control points, eight control points, or some other number of control points) can be defined by adding additional control point vectors, for example at the lower corners of the current block 702, the center of the current block 1500, or other position in the current block 1500.

The motion vectors $\vec{v}_0$ and $\vec{v}_1$ corresponding to control points 1510 and 1512 can be used to generate a motion vector (V) 1504 representative of the current block 1500, which can be stored in the HMVP table (e.g., HMVP table 400) for use when coding future blocks. As previously noted, the affine model uses multiple control points (e.g., control points 1510, 1512) to derive multiple motion vectors for a block. For example, the affine model can generate multiple local motion vectors for sub-blocks or pixels of a block. However, the HMVP table used in certain video coding standards may only support and/or include a single translational motion vector per block in the HMVP list. Thus, in some examples, to include motion information produced and/or utilized in coding a block (e.g., current block 1500) using the affine motion model, a single motion vector (e.g., $\vec{v}_C$ 1504) representative of the block can be generated using other motion vectors (e.g., $\vec{v}_0$ and $\vec{v}_1$) from control points (e.g., control points 1510 and 1512) in the block. The HMVP table can then be updated to include the motion vector generated for the affine coded block.

In some examples, the motion vector ($\vec{v}_C$) 1504 can be a motion vector generated for a particular location of the current block 1500, based on the motion vectors $\vec{v}_0$ and $\vec{v}_1$ corresponding to control points 1510 and 1512. In the example shown in FIG. 15, the motion vector ($\vec{v}_C$) 1504 corresponds to sub-block 1502 at a center position of the current block 1500. The center position can reflect an average and/or representation of the overall motion information of the current block 1500 and/or each sub-block in the current block 1500. Accordingly, the sub-block 1502 at the center position can be used as a motion vector representative of the overall motion information of the current block 1500.

In some cases, the motion vector ($\vec{v}_C$) 1504 can be generated based on a difference between the motion vectors $\vec{v}_0$ and $\vec{v}_1$ and/or a rate of change between the motion vectors $\vec{v}_0$ and $\vec{v}_1$. For example, a rate of change between the motion vectors $\vec{v}_0$ and $\vec{v}_1$ can be calculated for the vertical and horizontal components. In some cases, the rate of change between the motion vectors $\vec{v}_0$ and $\vec{v}_1$ can be calculated per sample for the vertical and horizontal dimensions. For example, the difference between the motion vectors $\vec{v}_0$ and $\vec{v}_1$ can be calculated to determine a total difference, which can then be divided by the number of samples between the control points associated with the motion vectors $\vec{v}_0$ and $\vec{v}_1$ to obtain a per sample rate of change between the motion vectors $\vec{v}_0$ and $\vec{v}_1$.

The rate of change calculated can then be used to estimate a motion vector for a particular location within the current block 1500. For example, since the sub-block 1502 in FIG. 15 corresponds to a center position within the current block 1500, the motion vector for the sub-block 1502 can be calculated by dividing the width of the current block 1500 by two to obtain a rate of change multiplier corresponding to the center position (e.g., the number of samples between the center position and either control point 1510 or 1512 or stated otherwise the distance in number of samples from one end of the current block 1500 (e.g., the left or right border) to the center position) and increasing (e.g., multiplying) the rate of change between the motion vectors $\vec{v}_0$ and $\vec{v}_1$ by the rate of change multiplier.

To illustrate, if the per sample rate of change between the motion vectors $\vec{v}_0$ and $\vec{v}_1$ is x and the width of the current block 1500 is 8, the per sample rate of change x can be multiplied by the result of dividing 8 (the width of the current block 1500) by 2. Here, the result of dividing 8 by 2 is 4, which represents the rate of change multiplier for the center position (e.g., the number of samples to the center position), and the motion vector for the sub-block 1502 is 4x (e.g., the rate of change x times 4). The motion vector for the sub-block 1502 can then be stored in the HMPV table as the translational motion vector corresponding to the current block 1500.

In some examples, the derivation of a motion vector for an affine-coded CU using the center position of the affine-coded CU, denoted as center_subblock_mv, can be as follows. Given the top-left and top-right CPMV, denoted as CPMV_top_left and CPMV_top_right, and the CU width and height respectively denoted as w and h:

$$\text{mvScaleHor=CPMV\_top\_left\_hor}<<7 \quad \text{Equation (14)}$$

$$\text{mvScaleVer=CPMV\_top\_left\_ver}<<7 \quad \text{Equation (15)}$$

$$d\text{HorX=(CPMV\_top\_right\_hor-CPMV\_top\_left\_hor)}<<(7-\log 2(w)) \quad \text{Equation (16)}$$

$$d\text{VerX=(CPMV\_top\_right\_ver-CPMV\_top\_left\_ver)}<<(7-\log 2(w)) \quad \text{Equation (17)}$$

In the event the bottom-left CPMV is presenting and denoted as CPMV_bottom_left:

$$d\text{HorY=(CPMV\_bottom\_left\_hor-CPMV\_top\_left\_hor)}<<(7-\log 2(h)) \quad \text{Equation(18)}$$

$$d\text{VerY=(CPMV\_bottom\_left\_ver-CPMV\_top\_left\_ver)}<<(7-\log 2(h)) \quad \text{Equation (19)}$$

Otherwise:

$$d\text{HorY}=-d\text{VerX} \quad \text{Equation (20)}$$

$$d\text{VerY}=d\text{HorX} \quad \text{Equation (21)}$$

where CPMV_top_left_hor and CPMV_top_left_ver are the horizontal and vertical component of top-left CPMV, CPMV_top_left; and CPMV_top_right_hor and CPMV_top_right_ver are the horizontal and vertical component of top-right CPMV, CPMV_top_right. The motion vector for a center sub-block can then be derived as follows:

$$\text{center\_subblock\_mv\_hor=(mvScaleHor+}d\text{HorX*}(w>>1)+d\text{HorY*}(h>>1)) \quad \text{Equation (22)}$$

$$\text{center\_subblock\_mv\_ver=(mvScaleVer+}d\text{VerX*}(w>>1)+d\text{VerY*}(h>>1)) \quad \text{Equation (23)}$$

$$\text{center\_subblock\_mv=(center\_subblock\_mv\_hor,center\_subblock\_mv\_ver)} \quad \text{Equation (24)}$$

Moreover, center_subblock_mv_info can include (or consists of in some cases) the motion vector center_subblock_mv and corresponding reference index. The HMVP candidate list can then be updated as follows: HMVPCandList=center_subblock_mv_info. In some examples, the motion vector 1504 in FIG. 15 can be center-sub-block mv calculated as described above in equations (14)-(24).

In some implementations, another sub-block location can be used for an HMVP table update, such as a top-left, top-right, bottom-left, bottom-right, or near-center location (e.g., with offset from center) sub-block position. In some implementations, the techniques described herein can insert the bottom-left CPMV or a certain sub-block motion vector other than the CU center position sub-block MV. In some cases, a normative process, such as the normative process provided below, can be performed.

In an example of an updating process for the history-based motion vector predictor candidate list, the inputs of the process can include luma motion vectors in 1/16 fractional-sample accuracy mvL0 and mvL1, reference indices refIdxL0 and refIdxL1, variables cbWidth and cbHeight specifying the width and the height of the luma coding block, a luma location (xCb, yCb) specifying the top-left sample of the current luma coding block relative to the top-left luma sample of the current picture, and history-based motion information table HmvpCandList. The output of this process can be the modified history-based motion information table HmvpCandList.

If affine_flag[xCb][yCb] is equal to 1, numCpMv is set to the number of control point motion vectors, cpMvLX[cpIdx] are set to the control point motion vectors of current block, with cpIdx=0, . . . , numCpMv−1 and X being 0 or 1, horizontal change of motion vector dX, vertical change of motion vector dY and base motion vector mvBaseScaled are derived by invoking the derivation process for affine motion model parameters from control point motion vectors described below, with the luma coding block width cbWidth, the luma coding block height cbHeight, number of control point motion vectors numCpMv and the control point motion vectors cpMvLX[cpIdx] with cpIdx=0, . . . , numCpMv−1 as inputs. The motion vectors MvLX can be calculated as follows:

$$x\text{Pos}Sb=\text{cbWidth}>>1 \quad \text{Equation (25)}$$

$$y\text{Pos}Sb=\text{cbHeight}>>1 \quad \text{Equation (26)}$$

$$\text{mv}LX[0]=(\text{mvBaseScaled}[0]+dX[0]*x\text{Pos}Sb+dY[0]*y\text{Pos}Sb) \quad \text{Equation (27)}$$

$$\text{mv}LX[1]=(\text{mvBaseScaled}[1]+dX[1]*x\text{Pos}Sb+dY[1]*y\text{Pos}Sb) \quad \text{Equation (28)}$$

The rounding process for motion vectors, as further described below, can be invoked with mvX set equal to mvLX, rightShift set equal to 5, and leftShift set equal to 0 as inputs and the rounded mvLX as output. Moreover, the motion vectors mvLX can be clipped as follows:

$$\text{mv}LX[0]=\text{Clip3}(-2^{17},2^{17}-1,\text{mv}LX[0]) \quad \text{Equation (29)}$$

$$\text{mv}LX[1]=\text{Clip3}(-2^{17},2^{17}-1,\text{mv}LX[1]) \quad \text{Equation (30)}$$

The MVP candidate hMvpCand can include (or can consist of in some cases) the luma motion vectors mvL0 and mvL1, the reference indices refIdxL0 and refIdxL1. NumHmvpCand can be set to the number of motion entries in HmvpCandList.

If slice type is equal to P and refIdxL0 is valid or if slice type is equal to B and either refIdxL0 or refIdxL1 is valid, the candidate list HmvpCandList is modified using the candidate mvCand by the following steps (in some cases the steps can be performed in any other order). First, the variable curIdx is set equal to NumHmvpCand. If NumHmvpCand is equal to 23, for each index hMvpIdx=1, . . . , NumHmvpCand−1, copy HMVPCandList[hMvpIdx] to HMVPCandList[hMvpIdx−1], and copy hMvpCand to HMVPCandList[hMvpIdx]. If NumHmvpCand is smaller than 23, NumHmvpCand is increased by 1.

The derivation process for affine motion model parameters from control point motion vectors referenced above can be invoked as follows. First, the inputs for the derivation process can include variables cbWidth and cbHeight specifying the width and the height of the luma coding block, the number of control point motion vectors numCpMv, and the control point motion vectors cpMvLX[cpIdx], with cpIdx=0, . . . , numCpMv−1 and X being 0 or 1. The outputs of the process can include the horizontal change of motion vector dX, the vertical change of motion vector dY, and the motion vector mvBaseScaled corresponding to the top left corner of the luma coding block.

The variables log 2CbW and log 2CbH can be derived as follows:

$$\log 2CbW = \text{Log } 2(cbWidth) \qquad \text{Equation (31)}$$

$$\log 2CbH = \text{Log } 2(cbHeight) \qquad \text{Equation (32)}$$

Horizontal change of motion vector dX can be derived as follows:

$$dX[0]=(cpMvLX[1][0]-cpMvLX[0][0])<<(7-\log 2CbW) \qquad \text{Equation (33)}$$

$$dX[1]=(cpMvLX[1][1]-cpMvLX[0][1])<<(7-\log 2CbW) \qquad \text{Equation (34)}$$

Vertical change of motion vector dY can be derived as follows. If numCpMv is equal to 3, dY can be derived as follows:

$$dY[0]=(cpMvLX[2][0]-cpMvLX[0][0])<<(7-\log 2CbH) \qquad \text{Equation (35)}$$

$$dY[1]=(cpMvLX[2][1]-cpMvLX[0][1])<<(7-\log 2CbH) \qquad \text{Equation (36)}$$

Otherwise (numCpMv is equal to 2), dY can be derived as follows:

$$dY[0]=-dX[1] \qquad \text{Equation (37)}$$

$$dY[1]=dX[0] \qquad \text{Equation (38)}$$

Motion vector mvBaseScaled corresponding to the top left corner of the luma coding block can be derived as follows:

$$mvBaseScaled[0]=cpMvLX[0][0]<<7 \qquad \text{Equation (40)}$$

$$mvBaseScaled[1]=cpMvLX[0][1]<<7 \qquad \text{Equation (41)}$$

The rounding process for motion vectors referenced above can be invoked as follows. The inputs to this process can include the motion vector mvX, the right shift parameter rightShift for rounding, and the left shift parameter leftShift for resolution increase. The output of this process can be the rounded motion vector mvX. For the rounding of mvX, the following applies:

$$\text{offset}=(\text{rightShift}==0)?0:(1<<(\text{rightShift}-1)) \qquad \text{Equation (42)}$$

$$mvX[0]=((mvX[0]+\text{offset}-(mvX[0]>=0))>>\text{rightShift})<<\text{leftShift} \qquad \text{Equation (43)}$$

$$mvX[1]=((mvX[1]+\text{offset}-(mvX[1]>=0))>>\text{rightShift})<<\text{leftShift} \qquad \text{Equation (44)}$$

FIG. 16 is a flowchart illustrating an example method 1600 (also referred to as process) for updating a history-based motion prediction table with motion information generated from an affine-coded block.

At block 1602, the method 1600 can include obtaining one or more blocks of video data. For example, the one or more blocks can include a block coded using an affine motion mode, as previously described. In some cases, the one or more blocks can include a current block. Moreover, in some examples, the video data can include a current picture and a reference picture.

At block 1604, the method 1600 can include determining a first motion vector (e.g., $\vec{v}_0$) derived from a first control point (e.g., control point 1510) of a block (e.g., current block 1500) of the one or more blocks. The block can include a block coded using an affine motion mode. At block 1606, the method 1600 can include determining a second motion vector (e.g., $\vec{v}_1$) derived from a second control point (e.g., control point 1512) of the block.

At block 1608, the method 1600 can include estimating, based on the first motion vector and the second motion vector, a third motion vector (e.g., motion vector 1504) for a predetermined location within the block. In some examples, the third motion vector can be calculated based on equations (14)-(24) described above. In some cases, the third motion vector can be a representation of motion information for the block (e.g., for the entire block).

In some cases, the predetermined location can be a center of, or certain position in, the block. In some examples, the first control point can be a top-left control point and the second control point can be a top-right control point. In some cases, the third motion vector can be estimated further based on a control point motion vector associated with a bottom control point, such as a bottom-left control point.

In some examples, estimating the third motion vector can include determining, based on a difference between the first motion vector and the second motion vector, a rate of change between the first motion vector and the second motion vector, and multiplying the rate of change by a multiplication factor corresponding to the predetermined location. In some cases, the predetermined location can include a center of the block, and the multiplication factor can include half of a width of the block and/or a height of the block.

In some cases, the rate of change can be a per unit rate of change. Moreover, each unit of the per unit rate of change can include a sample, a sub-block, and/or a pixel. In some examples, the multiplication factor can include a number of samples between the predetermined location and a border of the block. For example, if the predetermined location is a center of the block and the block includes n number of samples along a dimension of the block, the multiplication factor can be n divided by 2, which in this example corresponds to the number of samples to the center of the block.

In some implementations, the third motion vector can be based on a first change of motion between a horizontal component of the first motion vector and a horizontal component of the second motion vector, and a second change of motion between a vertical component of the first motion vector and a vertical component of the second motion vector.

In some examples, the third motion vector can be a translational motion vector generated based on affine motion information associated with the block. Moreover, the third motion vector can include motion information associated with one or more sub-blocks of the block. In some examples, at least one sub-block of the one or more sub-blocks can correspond to the predetermined location.

At block 1610, the method 1600 can include populating a history-based motion vector predictor (HMVP) table (e.g., HMVP table 400) with the third motion vector. In some cases, the HMVP table and/or the third motion vector can be used in motion prediction of an additional block, such as a future block.

In some aspects, the method 1600 can include adding one or more HMVP candidates from the HMVP table to an advanced motion vector prediction (AMVP) candidate list and/or a merge mode candidate list.

In some examples, the processes described herein may be performed by a computing device or an apparatus, such as the encoding device 104, the decoding device 112, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Specific details of the encoding device 104 and the decoding device 112 are shown in FIG. 17 and FIG. 18 respectively. FIG. 17 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 17 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 17, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of this disclosure have generally been described with respect to the encoding device 104, but as mentioned above, some of the techniques of this disclosure may also be implemented by post processing device 57.

The encoding device 104 of FIG. 17 represents an example of a video encoder configured to perform one or more of the transform coding techniques described herein. The encoding device 104 may perform any of the techniques described herein, including the processes described above with respect to FIG. 16.

FIG. 18 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 17.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 18 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

The decoding device 112 of FIG. 18 represents an example of a video decoder configured to perform one or more of the transform coding techniques described herein. The decoding device 112 may perform any of the techniques described herein, including the method 1600 described above with respect to FIG. 16.

In the foregoing description, aspects of the application are described with reference to specific embodiments thereof, but those skilled in the art will recognize that the subject matter of this application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for processing video data, the apparatus comprising:
   memory; and
   one or more processors coupled to the memory, the one or more processors being configured to:
      obtain one or more blocks of video data;
      determine a first motion vector derived from a first control point of a block of the one or more blocks, the block being coded using an affine motion mode, wherein the first control point comprises a top-left control point;
      determine a second motion vector derived from a second control point of the block, wherein the second control point comprises a top-right control point;
      based on the top-left control point and the top-right control point, estimate a third motion vector for a center of the block; and
      populate a history-based motion vector predictor (HMVP) table with the third motion vector for the center of the block, wherein the HMVP table is populated with a single translational motion vector for one inter-prediction direction of each block of the one or more blocks, and the single translational motion vector for the block is the third motion vector.

2. The apparatus of claim 1, wherein to estimate the third motion vector the one or more processors are configured to:
   determine, based on a difference between the first motion vector and the second motion vector, a rate of change between the first motion vector and the second motion vector; and
   multiply the rate of change by a multiplication factor corresponding to the center of the block.

3. The apparatus of claim 2, wherein the multiplication factor comprises half of at least one of a width of the block and a height of the block.

4. The apparatus of claim 2, wherein the rate of change comprises a per unit rate of change, wherein each unit of the per unit rate of change comprises at least one of a sample, a sub-block, and a pixel.

5. The apparatus of claim 2, wherein the multiplication factor comprises a number of samples between the center of the block and a border of the block.

6. The apparatus of claim 1, wherein the third motion vector is based on a first change of motion between a horizontal component of the first motion vector and a horizontal component of the second motion vector and a second change of motion between a vertical component of the first motion vector and a vertical component of the second motion vector.

7. The apparatus of claim 1, wherein the third motion vector comprises motion information associated with one or more sub-blocks of the block, wherein at least one sub-block of the one or more sub-blocks corresponds to the center of the block.

8. The apparatus of claim 1, wherein at least one of the HMVP table and the third motion vector is used in motion prediction of an additional block.

9. The apparatus of claim 1, wherein the one or more processors are configured to:
   add one or more HMVP candidates from the HMVP table to at least one of an advanced motion vector prediction (AMVP) candidate list, a merge mode candidate list, and a motion vector prediction predictor for coding using the affine motion mode.

10. The apparatus of claim 1, wherein processing video data comprises encoding video data, wherein the one or more processors are configured to:
    generate an encoded video bitstream, the encoded video bitstream including the one or more blocks of video data.

11. The apparatus of claim 10, wherein the one or more processors are configured to:
    transmit the encoded video bitstream, the first control point and the second control point.

12. The apparatus of claim 1, wherein the one or more processors are configured to:
    decode the one or more blocks of video data using the affine motion mode.

13. The apparatus of claim 1, wherein the apparatus is a mobile device.

14. A method of processing video data, the method comprising:
    obtaining one or more blocks of video data;
    determining a first motion vector derived from a first control point of a block of the one or more blocks, the block being coded using an affine motion mode, wherein the first control point comprises a top-left control point;
    determining a second motion vector derived from a second control point of the block, wherein the second control point comprises a top-right control point;
    based on the top-left control point and the top-right control point, estimating a third motion vector for a center of the block; and
    populating a history-based motion vector predictor (HMVP) table with the third motion vector for the center of the block, wherein the HMVP table is populated with a single translational motion vector for one inter-prediction direction of each block of the one or more blocks, and the single translational motion vector for the block is the third motion vector.

15. The method of claim 14, wherein estimating the third motion vector comprises:
    determining, based on a difference between the first motion vector and the second motion vector, a rate of change between the first motion vector and the second motion vector; and
    multiplying the rate of change by a multiplication factor corresponding to the center of the block.

16. The method of claim 15, wherein the multiplication factor comprises half of at least one of a width of the block and a height of the block.

17. The method of claim 15, wherein the rate of change comprises a per unit rate of change, wherein each unit of the per unit rate of change comprises at least one of a sample, a sub-block, and a pixel.

18. The method of claim 15, wherein the multiplication factor comprises a number of samples between the center of the block and a border of the block.

19. The method of claim 14, wherein the third motion vector is based on a first change of motion between a horizontal component of the first motion vector and a horizontal component of the second motion vector and a second change of motion between a vertical component of the first motion vector and a vertical component of the second motion vector.

20. The method of claim 14, wherein the third motion vector comprises motion information associated with one or more sub-blocks of the block, wherein at least one sub-block of the one or more sub-blocks corresponds to the center of the block.

21. The method of claim 14, wherein at least one of the HMVP table and the third motion vector is used in motion prediction of an additional block.

22. The method of claim 14, further comprising:
adding one or more HMVP candidates from the HMVP table to at least one of an advanced motion vector prediction (AMVP) candidate list, a merge mode candidate list, and a motion vector prediction predictor for coding using the affine motion mode.

23. The method of claim 14, wherein the third motion vector comprises a representation of motion information for the block.

24. The method of claim 14, wherein processing video data comprises encoding video data, the method further comprising:

generating an encoded video bitstream, the encoded video bitstream including the one or more blocks of video data.

25. The method of claim 24, further comprising:
transmitting the encoded video bitstream, the first control point and the second control point.

26. The method of claim 14, further comprising:
decoding the one or more blocks of video data using the affine motion mode.

27. A non-transitory computer-readable storage medium having stored thereon instructions which, when executed by one or more processors, cause the one or more processors to:
obtain one or more blocks of video data;
determine a first motion vector derived from a first control point of a block of the one or more blocks, the block being coded using an affine motion mode, wherein the first control point comprises a top-left control point;
determine a second motion vector derived from a second control point of the block, wherein the second control point comprises a top-right control point;
based on top-left control point and the top-right control point, estimate a third motion vector for a center of the block; and
populate a history-based motion vector predictor (HMVP) table with the third motion vector for the center of the block, wherein the HMVP table is populated with a single translational motion vector for one inter-prediction direction of each block of the one or more blocks, and the single translational motion vector for the block is the third motion vector.

* * * * *